United States Patent
Shahlai et al.

(10) Patent No.: US 6,521,796 B2
(45) Date of Patent: Feb. 18, 2003

(54) DIHYDRO AND HEXAHYDRO ISOALPHA ACIDS HAVING A HIGH RATIO OF TRANS TO CIS ISOMERS, PRODUCTION THEREOF, AND PRODUCTS CONTAINING THE SAME

(75) Inventors: Khalil Shahlai, Kalamazoo, MI (US); Randall H. Mennett, Portage, MI (US); Paul H. Todd, Kalamazoo, MI (US); James A. Guzinski, Kalamazoo, MI (US)

(73) Assignee: Kalamazoo Holdings, Inc., Kalamazoo, MI (US)

(*) Notice: Subject to any disclaimer, the term of this patent is extended or adjusted under 35 U.S.C. 154(b) by 0 days.

(21) Appl. No.: 09/911,063

(22) Filed: Jul. 23, 2001

(65) Prior Publication Data

US 2002/0007084 A1 Jan. 17, 2002

Related U.S. Application Data

(62) Division of application No. 09/512,944, filed on Feb. 25, 2000.

(51) Int. Cl.[7] .................... C07C 45/67; C12C 3/00; C12H 1/04
(52) U.S. Cl. ............ 568/341; 568/366; 568/377; 568/347; 568/350; 426/600; 426/422
(58) Field of Search ............... 568/341, 347, 568/366, 350, 377; 426/600, 422

(56) References Cited

U.S. PATENT DOCUMENTS

| | | | |
|---|---|---|---|
| 3,044,879 A | 7/1962 | Koch | 426/16 |
| 3,364,265 A | 1/1968 | Klingel | 568/349 |
| 3,486,906 A | 12/1969 | Todd, Jr. | 426/590 |
| 3,552,975 A * | 1/1971 | Worden et al. | 426/538 |
| 3,558,326 A | 1/1971 | Westermann | 426/600 |
| 3,615,660 A | 10/1971 | Bavisotto | 426/600 |
| 3,765,903 A | 10/1973 | Clarke | 426/600 |
| 3,798,332 A | 3/1974 | Westermann | 426/29 |
| 3,875,316 A * | 4/1975 | Humphrey | 426/349 |
| 3,923,897 A | 12/1975 | Worden | 568/341 |
| 3,949,092 A | 4/1976 | Mitchell | 426/16 |

(List continued on next page.)

FOREIGN PATENT DOCUMENTS

| | | |
|---|---|---|
| GB | 1161787 | 8/1969 |
| WO | WO97/33971 | 9/1997 |

OTHER PUBLICATIONS

Ting & Goldstein; J. Amer. Soc. of Brewing Chemist Publication, No. J–1966–0319–01R; 54: 103–109 (1966).
Held; "Hop Products: Extracts, Pellets, and Modified Alpha and Beta Acids"; Technical Quarterly; vol. 35, No. 3; pp 132–138 (1998).

(List continued on next page.)

Primary Examiner—Paul J. Killos
Assistant Examiner—Taylor V. Oh
(74) Attorney, Agent, or Firm—The Firm of Hueschen and Sage

(57) ABSTRACT

This invention describes heretofore unknown forms of dihydro (DHIA) and hexahydro (HHIA) isoalpha acids having a high ratio of trans to cis isomers and a process for their production. Also, non-precipitating clear 5, 10, 20% and higher aqueous solutions thereof, since they are soluble at room temperature in soft water. This is due to the high ratio of trans to cis isomers. Unlike prior art essentially all cis isomer products, they remain haze free both at a neutral pH in water and at 1% to 2% and higher concentrations. This invention has the advantage over the prior art in that DHIA and HHIA can be provided as stable, non-separating liquids, at practical concentrations in the range of 5% to about 40%, which do not require heating to about 50° to 90° C. and above with stirring to effect dissolution of precipitates. The high trans products described herein can be admixed with isoalpha- and tetrahydro-isoalpha acids.

18 Claims, 10 Drawing Sheets

U.S. PATENT DOCUMENTS

| | | | | |
|---|---|---|---|---|
| 3,956,513 A | | 5/1976 | Clarke | 426/271 |
| 3,965,188 A | | 6/1976 | Westermann | 568/366 |
| 4,002,683 A | | 1/1977 | Todd, Jr. | 568/341 |
| 4,247,483 A | * | 1/1981 | Baker et al. | 568/341 |
| 4,324,810 A | | 4/1982 | Goldstein | 426/600 |
| 4,338,348 A | * | 7/1982 | Muller | 426/600 |
| 4,590,296 A | * | 5/1986 | Cowles et al. | 568/366 |
| 4,666,731 A | | 5/1987 | Todd, Jr. | 426/600 |
| 4,759,941 A | | 7/1988 | Chicoye | 426/600 |
| 4,767,640 A | | 8/1988 | Goldstein | 426/600 |
| 5,013,571 A | | 5/1991 | Hay | 426/600 |
| 5,200,227 A | | 4/1993 | Guzinski | 426/600 |
| 5,296,637 A | | 3/1994 | Stegink | 568/341 |
| 5,600,012 A | * | 2/1997 | Poyner et al. | 568/347 |
| 5,750,179 A | | 5/1998 | Gunzinski | 426/600 |
| 5,767,319 A | * | 6/1998 | Ting et al. | 568/347 |

OTHER PUBLICATIONS

"α– and β–Acids in Hops and Hop Pellets by Spectrophotometry and by Conductometric Titration" Prepared by the Technical Committe and the Editorial Committee of the ASBC; Methods of Analysis of the American Society of Brewing Chemists, Eighth Revised Edition; Hops–6; three pages (1992).

"Formazin Turbidity Standards"; Prepared by the Technical Committee and the Editorial Committee of the ASBC; Methods of Analysis of the American Society of Brewing Chemists, Eighth Revised Edition; Beer–26; three pages (1992).

* cited by examiner cis-isoalpha acids → cis-dihydro-isoalpha acids trans-isoalpha acids → trans-dihydro-isoalpha acids cis-tetrahydro-isoalpha acid → cis-hexahydro-isoalpha acid trans-tetrahydro-isoalpha acid → trans-hexahydro-isoalpha acid

US 6,521,796 B2

DIHYDRO AND HEXAHYDRO ISOALPHA ACIDS HAVING A HIGH RATIO OF TRANS TO CIS ISOMERS, PRODUCTION THEREOF, AND PRODUCTS CONTAINING THE SAME

The present application is a division of application Ser. No. 09/512,944 of Feb. 25, 2000.

BACKGROUND OF THE INVENTION

1. Field of the Invention

Dihydro and hexahydro isoalpha acids having a high ratio of trans to cis isomers, process for the production thereof, and products containing the same.

2. Prior Art

There are four types of isoalpha acids: the unreduced form, called isoalpha acids (isohumulone) (IA), and three types of reduced forms of IA. The latter are dihydro-isoalpha acids (DHIA), also known as "rho", tetrahydro-isoalpha acids (THIA), and hexahydro-isoalpha acids (HHIA). Each is present as three major analogues differing in an acyl side chain (the co, n, and ad analogues) and as trans and cis and optical isomers. The proportions of analogues depends upon the variety of hops used to make the iso acids. Only IA, DHIA, and THIA have been and are available as aqueous forms. Their structures are shown in FIGS. 1 and 2.

IA and THIA do not form insoluble crystalline precipitates upon standing, due to their chemical composition, which includes a keto group on the lower acyl side chain. Commercially available all cis isomer DHIA and HHIA have this keto group reduced to an alcohol. They form precipitates over time, which are exceptionally hard to redissolve. Their solubility in water at pH 10 is about 1%, and much less at pH 7 to 8. The products described herein, containing large amounts of the trans isomers of DHIA and HHIA, are remarkably and unexpectedly soluble in water and overcome this limitation, being soluble in water at all concentrations below about 10% to 40%, depending upon the trans isomer content.

More Detailed Description of the Prior Art

Today, the four types of iso acids used by the brewer are liquids, consisting of their potassium salts in water or propylene glycol. Solids in the form of magnesium chelates have been substantially replaced by the liquids in the last decade.

Because of differences in the concentrations at which the solutions of a particular type of iso acid are most stable against precipitation, the four acid types are sold in different concentrations in different solvent systems. IA is sold as a 30% solution of its potassium salt at a pH of about 10 in water. DHIA is sold as a 35% solution of its potassium salt in water at a pH of about 10.5 and above, from which large, insoluble crystals of DHIA will precipitate over time. THIA is used as a 5% or 10% solution of its potassium salt at a pH of about 9.5 to 10.5 in water; and HHIA is not sold as an aqueous solution per se because of its limited solubility. Because of the keto groups in their side chains, neither IA nor THIA form crystals from saturated solutions, but rather can form gums at the bottom of the container upon cooling and standing. In these commercial preparations, the hop acids, and particularly 30% IA and 35% DHIA, as potassium salts at pH 10 or above in water, act as co-solvents for themselves. The co-solvent effect is demonstrated by the known tendency to precipitate and separate at lower concentrations, as discussed below under the Westermann prior art. However, all forms of hop acids can be solubilized in propylene glycol, as described in Todd (U.S. Pat. No. 3,486,906), and are available in this form, which also adds the advantage of increasing their dispersibility in soft water at pH 10 and above. Propylene glycol and ethanol solutions are the only forms of HHIA available, and their utility is impaired by the requirement of a solvent. The high trans products overcome the need to use propylene glycol or ethanol as a solvent. It should be noted that soft water must be used as the diluting agent for all potassium salt solutions of the iso acids, since calcium and magnesium in the water will form chelates with hop acids and cause a haze and agglomerates and gummy precipitates. Below pH about 9 to 10 in deionized water, the dilute solutions of the prior art DHIA and HHIA do not form a clear solution upon mixing but rather form gummy precipitates upon standing. The high trans products do not.

One common method of adding the hop acids post-fermentation is to dilute them to a 1% or less concentration in soft water to which KOH has been added to bring the pH to 10 or above (Held, Master Brewers of the Americas Association Tech. Quarterly, 35, 132–138, No. 3 (1998). The high pH of the water is essential to prevent the formation of precipitates in the 1% dilute solution, and this has been ascribed to incomplete solubility of the hop acids in the dilute aqueous solution at lower pHs. These dilute alkaline solutions form hazes upon standing, and also form precipitates causing haze after injection into beer or "stringers" of precipitates on the inside of a pasteurized beer bottle. The viscosities of the concentrated solutions make it impractical to inject them directly into beer, and in addition they tend to "shock out" and form particulate matter due to the rapid reduction of pH as they are introduced, plugging the injection nozzle from time to time.

Solid magnesium chelates of IA are well described in Clarke, (U.S. Pat. No. 3,765,903 and 3,956,513). Others have added to his basic concept, but all IA chelates behave similarly. Chelates of DHIA and HHIA have never been commercialized. The water-insoluble microparticulate solid chelates are added to water, in which they disperse as a cloudy haze which in turn is added to the unfinished beer. Other chelate preparations are described in Humphrey (U.S. Pat. No. 3,875,316) and Mitchell (U.S. Pat. No. 1,161,787).

Aqueous suspensions of solid micro particles of DHIA and HHIA are described in Guzinski (PCT/US97/04070). These suspensions were made from commercial all cis products (p12, 1 23–24) made by the prior art procedures described herein. They are suspensions. They had the advantage over the prior art commercial solutions of DHIA in that they did not require heating to about 80–90° C. to redissolve precipitates before use. Indeed, one of the major advantages was the ability to redissolve the micro-particles by heating to about 60° C. The redissolved solution was in turn diluted to 1% in soft water at a pH of 10 prior to injection in the beer. Alternatively, the micro particles could be added directly to pH 10 soft water preheated to about 50° C., wherein they would dissolve and form a clear 1% solution within five minutes. The 1% solution, as in the case of the other prior art commercial products, forms a haze upon standing (page 23, line 5), while the high trans product does not. Furthermore, his product, like other prior art products, is not soluble at a 1% concentration in neutral soft water, whereas the products described herein are completely soluble. And furthermore, his product still required heating, albeit less vigorous than 80–90° C. The novel high trans product can preferably be used at ambient temperature, including brew-house cellar temperatures of 10° C. or less. The commercialization of his product was abandoned because of its limitations in practical brewing use, and particularly the need to heat it and the lack of clarity upon dilution.

DHIA is made from alpha acids by isomerization and reduction using sodium borohydride, first described by Koch (U.S. Pat. No. 3,044,879). A superior process based on Koch was described in Westermann (U.S. Pat. No. 3,798,332), which used an extract made by his earlier invention (U.S. Pat. No. 3,558,326). Goldstein (U.S. Pat. No. 4,324,810) describes a method of making DHIA without the use of organic solvents. Today, manufacturers optionally separate the alpha acids from the remainder of the extract prior to isomerization and reduction, as described in Goldstein U.S. Pat. No. 4,767,640. These investigators produced the essentially all cis forms of the acids.

Todd (U.S. Pat. No. 4,002,683) describes an improved method for separation of alpha acids and subsequent isomerization to IA, which is the preferred method of separating alpha acids from an extract. A less desirable procedure for the separation of alpha acids from an extract and conversion to IA is given in Klingel, (U.S. Pat. No. 3,364,265), who also describes solid salts of IA. Mitchell (U.S. Pat. No. 3,949,092) describes a superior process. The method of separating and purifying the alpha acids is not critical to the disclosed process. The purity of the reduced product is a critical element. As the Examples also show, the ratio of trans to cis isomers is very critical, and new to the art.

Procedures for making THIA from alpha acids are described in Stegink (U.S. Pat. No. 5,296,637), and Hay, (U.S. Pat. No. 5,013,571). THIA is made from beta acids after the procedure of Worden, (U.S. Pat. No. 3,923,897). HHIA is made by borohydride reduction after the method of Todd (U.S. Pat. No. 4,666,731, Example 10), who employs less than half the molar equivalents of Worden, (U.S. Pat. No. 3,552,975) to achieve reduction in a highly alkaline medium. Hay also describes the catalytic reduction of cis DHIA to make cis HHIA. HHIA, like DHIA, must be substantially free of impurities if it is to form the novel product of the present invention. None of these investigators have suggested this aspect of the present invention.

Guzinski (U.S. Pat. No. 5,200,227) describes mixtures of the prior art concentrated aqueous products which, due to co-solvent effects, do not readily crystallize. These had the advantage of physical stability over the single acid products, but imposed limitations on the ratios of different acids which the brewer could add to a beer. Occasionally, it was found that large crystals would form from these mixtures after prolonged storage, but not to the extent formed in the single-acid forms of commerce. Because of the limitations on the ratios of the different hop acids, they have limited utility. These products formed two phase, gummy solutions upon dilution in water, just as do prior art 35% DHIA solutions. The novel forms of DHIA and HHIA described herein overcome these limitations, since they are non-crystallizing and do not form gummy particulates.

Bavisotto (U.S. Pat. No. 3,615,660) describes the use of emulsifiers to stabilize DHIA extracts and make them suitable for adding to wort or beer. The instant products overcome the need for the use of emulsifying agents which end up in the beer, and the precipitation of the DHIA extract as the emulsion breaks upon addition to the beer.

Ting and Goldstein *J. Am. Soc. Brew. Chem.* 54, 103–109 (1996) describe the chemistry and purification of hop acids and their derivatives. Their investigation examined specific pure cis and trans isomers. They further described the physical properties of certain of these isomers. They did not evaluate the solubilities of their pure compounds, including their crystalline compounds and mixtures of them in water. They did not have, or suggest, the novel high trans isomer content aqueous solutions as described herein, containing all of the analogues of the parent hop.

While the primary function of hops is to provide bittering to beer, a secondary function is to provide aroma. The aroma is derived from the essential oil contained in the hop cone. Aroma control is compatible with this invention by addition of hop essential oil to the kettle (preferably in the saponified extract described in Guzinski, U.S. Pat. No. 5,750,179). This invention also allows the addition of hop essential oil to the DHIA and HHIA solutions, wherein it is sufficiently soluble to enable the brewer to add controlled amounts of essential oil to the finished brew.

Held, cited above, summarizes the status of prior art hopping methodology.

OBJECTS OF THE INVENTION

The objects of this disclosure are to provide DHIA and HHIA having a high trans to cis isomer ratio and, as a consequence, to provide:

1. A non-precipitating solution of DHIA and/or HHIA.
2. Non-precipitating mixtures of DHIA and/or HHIA solutions with added IA and THIA.
3. Hop acid solutions which do not form a haze or particulates upon direct injection into finished beer.
4. The analytical criteria which will provide quality assurance for the products, and which differentiates them from all prior art products.
5. The operational variables which may be adjusted by the manufacturer when making the novel products.

The Present Disclosure: A General Description of the Highly Soluble, High Trans Isomer Ratio Products of this Specification and Clear Solutions Thereof and a Discussion of the Most Relevant Prior Art This specification discloses DHIA and HHIA having a high ratio of trans to cis isomers and which form clear, non-precipitating aqueous solutions of DHIA and HHIA, both of which are unknown to the prior art. This is due to the heretofore unknown effect of the trans isomers in increasing the solubility of the cis isomers. There is no explanation of this effect, which is contrary to the expectation that higher solute contents decrease solubility of all solutes. This effect is noticed in both neutral and slightly (up to pH 10–11) alkaline water. Because of the improved solubility in relatively low pH aqueous media and beer, the ease of use and utilization in the brewery is vastly improved as compared with the prior art cis products.

They do not form precipitates which must be heated to redissolve, or which must be filtered from the beer. They are soluble in soft water and their dilute solutions will not form hazes in the brewing cellar injection tank. Because the purity of the hop acid must be high to make them clear, they do not contribute an off-flavor "hang" to the beer, but rather possess only the desired fleeting bitterness without after-bitter, especially on the palate. They can be directly injected into finished beer without forming haze or visible particulates, contrary to prior art products.

The preparation of the product critically differs from the prior art in that the reduction is performed in an aqueous medium with sodium borohydride (potassium borohydride is less preferred) at a pH below about 12, and preferably in the range of about 10 to 11, and at temperatures, times and concentrations which do not convert trans isomers to cis isomers. Prior art products are made using a more highly alkaline aqueous medium (pH 13.5), since it is well known that borohydrides decompose readily if the water in which they are dissolved is not highly alkaline. The presently-disclosed and critical procedure allows some borohydride to decompose due to the lower pH, while the remainder acts as a reducing agent. Buffers may be used to achieve relatively stable pHs during the reduction.

The effect of the lower pH on the DHIA or HHIA is to allow trans isomers to form without being changed to the cis isomer. It increases the critical ratio of trans to cis isomers. Unless the trans isomer HPLC area count is at least 10% of the cis isomer area count, and preferably greater than about 20 to 30%, the product will not form a clear liquid aqueous solution at all concentrations from 1% to 20% and more. This is critical to the invention. Prior art products have a ratio of trans to cis isomers of less than about 3% to 5% and, in most, trans isomers are undetectable. None of them will form clear solutions at concentration ranges of 10–20% in water, even at elevated pHs. The novel solubility properties of high trans isomer ratio containing DHIA and HHIA are disclosed for the first time in this specification.

The preferred method also involves the reduction of IA rather than alpha acids. This increases the trans isomer ratio more than if a simultaneous isomerization/reduction is performed, as is the common prior art practice. The simultaneous isomerization-reduction does not produce an acceptable product.

The most elegant prior art investigations of DHIA have been done at the Miller Brewing Co. laboratories.

The initial disclosure of a process for making DHIA is Koch, cited above, filed in 1959. His examples use more than three to four times as much borohydride as the current art. Improved analytical techniques have enabled his Miller successors to refine his basic process. Koch's DHIA products were dissolved in ethanol and added to boiling wort, so they obviously were not suitable for post-fermentation addition.

The Westermann series built on Koch, and developed practical processes for making DHIA using simultaneous isomerization/reduction. More importantly, in U.S. Pat. No. 3,965,188, they showed how to make DHIA solutions suitable for post-fermentation addition because of higher purity than achieved by Koch, wherein "the purity is so high (at least 90%) that the increase in turbidity is minimal". (Col. 2, line 10 ff). His procedures, because of the use of SWS (12% NaBH4 in 40% NaOH), does not make a high trans DHIA but rather an all cis one, which will form precipitates upon standing. This is why the high trans product cannot be made by Westermann's U.S. Pat. No. 3,558,326. He claimed purities of between 97.4 and 99.2%. Example 13 shows that his product is 77 to 78% rather than 99.2% DHIA by the standards described in this specification. Nor is it haze free, as is the product described herein.

It must be recognized that his "purities" were determined by the best method available at the time, which consisted of extracting the "pure" DHIA from its alkaline solution into a water immiscible solvent, removing the solvent, and assaying the solids in alkaline methanol. The standard procedure at that time was to determine the absorbance at 254 nm of an alkaline methanol solution of the solids, and calculate the DHIA content using some extinction coefficient (not mentioned in his specification). Regardless of the value of that coefficient, his solids would have contained some humulinic acids, as well as other materials having absorbance at 254, and they would have been considered DHIA by his assay. Furthermore, as shown in the comparative Example 11, his product formed cloudy solutions at pH 10 in water, and curds and precipitates at pH 7. It did not contain trans isomers.

Goldstein, following Westermann at the Miller Brewing laboratories, also performs a simultaneous isomerization/reduction in U.S. Pat. No. 4,324,810. He also uses SWS, a commercial 12% sodium borohydride solution in 40% NaOH, and therefore his reduction is carried out under highly alkaline conditions which cause only cis isomers to form. His Examples 4 plus 5 show an overall yield of 82.7% of available DHIA with a purity of 96%. Not only was this an improvement on the yields of Westermann, but he achieved his paramount objective of performing the reduction without the use of solvents other than water. Again, the precise method by which he obtained his purity estimate of 96% is not given. As comparative Example 14 shows, his product was 74% DHIA vs his claimed 96%, by the state of the art techniques used in describing the purity of DHIA in this specification. His product did not contain trans isomers, nor did it form clear 1% solutions.

Goldstein in U.S. Pat. No. 4,767,640 separates the alpha acids from the extract, at a marginally higher pH than the critical pH of Todd, prior to isomerization/reduction without the use of solvents. He obtains an improved product, devoid of non-isohumulone light unstable products (NILUPS) found in the prior art products. (While Westermann claimed complete light stability, it is clear that the detection of instability had progressed by the time of Goldstein's invention, and he was able to improve the light stability of Westermann's products.) His product is claimed suitable for post-fermentation addition to beer, but not specifically for pre- or post- final filtration. This may be because his product forms amorphous agglomerates and crystals on standing. It does not contain trans isomers. This is because his isomerization/reduction, as in Westermann, is conducted in a highly alkaline medium to start with. Comparative Examples 15 and 16 describe his products. Injection of his products into finished beer cause insoluble precipitates to form. These are visible to the naked eye even after pasteurization.

While Goldstein prefers to avoid the use of solvents in his process, innocuous solvents such as hydrocarbons C-10 and below are useful in assisting the separations and purifications of the high trans products. They are not essential but rather optional and will assist in the removal of the unwanted impurities, some of which are visible as post hop acid peaks in the HPLC. Others, such as "waxes", may be undetectable in the HPLC assay. These must be substantially absent for the claimed DHIA and HHIA to remain clear in aqueous solutions when added to soft water.

Chicoye et al, in U.S. Pat. No. 4,759,941, describe a method for making DHIA by treating hop pellets with borohydride. From his reaction mixture, he is able to separate an aqueous fraction which he adds post kettle. He makes no claim that it can be added to finished beer, and therefore does not suggest the products described herein. Surprisingly, when pure alpha acids were reduced following his procedure, the reduction was incomplete and substantial impurities were formed. Perhaps his cellulosic materials act as a catalyst for the reaction to produce high by-product levels in his procedure. Trans isomers were not detected in his reactive product from alpha acids.

Guzinski's all cis microcrystalline product, which requires heating to redissolve, either by itself or in alkaline water, is clearly not a relevant prior art disclosure. Likewise, his slowly precipitating mixtures of hop acids, which utilize their cosolvent effect, but are all cis isomers, do not suggest that the presence of trans isomers inhibits and prevents the crystallization of cis isomers. Nor do the solids of Clarke. HHIA is not available as an aqueous product, since the all cis form, made by the Todd procedure (U.S. Pat. No. 4,666, 731), is very insoluble.

Table 7-I in Example 7 summarizes the critical differences between products from the comparative Examples and the herein claimed process, as well as the effect a high trans isomer content has on solubility. Table 9-I in Example 9 shows the differences in performance of the products in beer.

SUMMARY OF THE INVENTION

What we believe to be our invention, then, inter alia, comprises the following, singly or in combination:

A mixture of hexahydro-isoalpha acids (HHIA) or dihydroisoalpha acids (DHIA) having a ratio of trans to cis isomers greater than 10%.

And a mixture of hexahydro-isoalpha acids (HHIA) having a ratio of trans to cis isomers greater than 10%;

such a mixture comprising hexahydro-isocoalpha acids, hexahydro-iso-n-alpha acids, and hexahydro-isoadalpha acids;

such a mixture wherein the ratio is greater than 20%;

such a mixture wherein the ratio is greater than 40%; and such a mixture wherein the ratio is greater than 70%.

Also, such a mixture in the form of an aqueous solution of potassium salts of the HHIA, which solution forms a single phase liquid at a 20% concentration by weight of the potassium salts at a pH less than 9.5;

such a mixture wherein the solution forms a single phase liquid at a 10% concentration by weight of the potassium salts of the HHIA at a pH less than 8.5;

such a mixture in the form of an aqueous solution of the potassium salts of the HHIA at a pH of 7 to 10.5 which is a single-phase solution when at a concentration of 5% by weight;

such a mixture in the form of an aqueous solution of the potassium salts of the HHIA at a pH of 7 to 9.5 which is a single-phase solution when at a concentration of 10% by weight; and such a solution which, when diluted to a 1% concentration by weight in distilled water, forms a clear solution which does not form a haze upon standing for six hours.

Also, such a mixture which contains less than 5% by weight of substances which elute after the HHIA as detectable as area percent by HPLC procedure;

such a mixture which contains less than 3% by weight of substances which elute after the HHIA as detectable as area percent by HPLC procedure;

such a mixture which contains less than 1% by weight of substances which elute after the HHIA as detectable as area percent by HPLC procedure;

such a mixture which contains less than 3% by weight of the HHIA of substances which can be removed from an aqueous solution of the HHIA by extraction into a hydrocarbon solvent of 6 to 10 carbon atoms;

such a mixture which contains less than 2% by weight of the HHIA of substances which can be removed from an aqueous solution of the HHIA by extraction into a hydrocarbon solvent of 6 to 10 carbon atoms;

such a mixture which contains less than 1% by weight of the HHIA of substances which can be removed from an aqueous solution of the HHIA by extraction into a hydrocarbon solvent of 6 to 10 carbon atoms; wherein the pH of the aqueous solution is below 10.5; wherein the pH of the aqueous solution is below 9.5; and wherein the pH of the aqueous solution is below about 8.5.

Such a solution admixed with a solution of DHIA or with isoalpha acids (IA) or tetrahydroisoalpha acids (THIA);

such a solution containing glycerine, propylene glycol, alcohol, or hop essential oil; and such a mixture in the form of solid potassium salts of the HHIA comprising between about 10% and 70% trans isomers.

And a mixture of dihydro-isoalpha acids (DHIA) having a ratio of trans to cis isomers greater than 10%;

such a mixture comprising dihydro-isocoalpha acids, dihydro-iso-n-alpha acids, and dihydro-isoadalpha acids;

such a mixture wherein the ratio is greater than 20%;

such a mixture wherein the ratio is greater than 30%.

Also, such a mixture in the form of an aqueous solution of potassium salts of the DHIA, which solution forms a single phase liquid at a 20% concentration by weight of the potassium salts at a pH less than 9.5;

such a mixture wherein the solution forms a single phase liquid at a 10% concentration by weight of the potassium salts of the DHIA at a pH less than 8.5;

such a mixture in the form of an aqueous solution of the potassium salts of the DHIA at a pH of 7 to 10.5 which is a single-phase solution when at a concentration of 5% by weight;

such a mixture in the form of an aqueous solution of the potassium salts of the DHIA at a pH of 7 to 9.5 which is a single-phase solution when at a concentration of 10% by weight; and such a solution which, when diluted to a 1% concentration by weight in distilled water, forms a clear solution which does not form a haze upon standing for six hours;

Also, such a mixture which contains less than 5% by weight of substances which elute after the DHIA as detectable as area percent by HPLC procedure;

such a mixture which contains less than 3% by weight of substances which elute after the DHIA as detectable as area percent by HPLC procedure;

such a mixture which contains less than 1% by weight of substances which elute after the DHIA as detectable as area percent by HPLC procedure;

such a mixture which contains less than 3% by weight of the DHIA of substances which can be removed from an aqueous solution of the DHIA by extraction into a hydrocarbon solvent of 6 to 10 carbon atoms;

such a mixture which contains less than 2% by weight of the DHIA of substances which can be removed from an aqueous solution of the DHIA by extraction into a hydrocarbon solvent of 6 to 10 carbon atoms;

such a mixture which contains less than 1% by weight of the DHIA of substances which can be removed from an aqueous solution of the DHIA by extraction into a hydrocarbon solvent of 6 to 10 carbon atoms;

wherein the pH of the aqueous solution is below 10.5;

wherein the pH of the aqueous solution is below 9.5;

wherein the pH of the aqueous solution is below about 8.5.

Such a solution containing glycerine, propylene glycol, alcohol, or hop essential oil;

such a mixture in the form of solid potassium salts of the DHIA comprising between about 10% and 70% trans isomers.

Moreover, such a mixture of DHIA or HHIA which is in the form of a single-phase aqueous solution of its potassium salts at a pH above about 7.5 when at a concentration of 20% by weight.

Furthermore, the process of reducing (a) isoalpha acids (IA) to produce dihydroisoalpha acids (DHIA) or (b) tetrahydroisoalpha acids (THIA) to produce hexahydroisoalpha acids (HHIA), the DHIA or the HHIA product having a trans to cis isomer ratio greater than 10%, the reduction being carried out in an aqueous medium at a pH of about 8.5 to about 12.4 using a borohydride;

such a process wherein IA are reduced to DHIA having a trans to cis isomer ratio greater than 10% using less than about 0.81 molar equivalents of a borohydride and a pH up to about 11.8;

such a process wherein THIA are reduced to HHIA having a trans to cis isomer ratio greater than 10% using less than about 0.81 molar equivalents of a borohydride;

such a process in which the temperature at which the reduction is carried out is up to about 75° C. and in which the reaction is terminated before the trans to cis isomer ratio of the product DHIA or HHIA becomes less than 10%;

such a process wherein the reduction is carried out with up to about 0.65 molar equivalents of borohydride;

such a process wherein the reduction is carried out with up to about 0.55 molar equivalents of borohydride;

such a process in which a lower alkanol is also present;

such a process wherein the pH of the aqueous medium is buffered at about 12.4 or below;

such a process wherein the buffering agent is selected from potassium and sodium salts of phosphates, citrates, and borates;

such a process in which a non-reactive water-immiscible solvent is also present;

such a process in which the water-immiscible solvent is a hydrocarbon containing 10 or less carbon atoms;

such a process in which hydrocarbon-soluble haze-forming substances are removed from the DHIA or HHIA product by admixing a hydrocarbon with the aqueous DHIA or HHIA phase and removing the hydrocarbon phase, wherein the aqueous DHIA or HHIA phase is 15% or less DHIA or HHIA, and wherein the pH is up to about 10.5, to give a DHIA or HHIA product wherein the remaining hydrocarbon-soluble substances are less than 3% by weight of the DHIA or HHIA product;

such a process in which the pH is about 7.5–9.5;

such a process wherein the hydrocarbon has 6 to 10 carbon atoms;

such a process in which the final aqueous DHIA or HHIA phase is concentrated at a pH below about 10.5 and greater than 6 by evaporation of water, to give a concentrated aqueous phase containing between about 5% and about 40% DHIA or HHIA;

such a process wherein the pH is between 6.5 and 8.5 and the DHIA or HHIA concentration is less than about 25%;

such a process wherein the borohydride is selected from the group consisting of sodium borohydride and potassium borohydride; and such a process wherein the DHIA having a trans to cis isomer ratio greater than 10% is subsequently converted to HHIA having a trans to cis isomer ratio greater than 10% by catalytic hydrogenation.

DEFINITIONS

Definitions Used in this Specification

As is known to the art, trans and cis isomers of the hop analogues exist. Critical to this invention is the heretofore unknown effect of a high trans:cis isomer ratio on the solubility of the DHIA and HHIA. In this specification, this ratio is expressed as the % of the HPLC area counts of the trans divided by the area counts of the cis isomers. In prior art products it is well below 5% and usually almost zero.

One measurement of % impurities eluting after the hop acids in the HPLC procedure is described below. It expresses the amount of haze forming substances, which are detectable by uv light, present relative to the amount of DHIA or HHIA. A second measurement relies on the extraction of non-absorbing haze forming substances with a water insoluble solvent, as described in Example 11 below.

Procedures Used in Analysis are as Follows

Ultra-violet spectra (UV). For a whole extract, the American Society of Brewing Chemists spectro procedure "Hops-6" was used. This entails diluting the test sample in alkaline methanol and running a scan, and using a formula to calculate % alpha acids. This procedure is included in the prior art references.

Absorption at 254 nm is a maximum for iso acids, and the strength of the sample is calculated on this basis using the extinction coefficient (E1%/1 cm). The sample is dissolved in alkaline methanol, the absorbance at 254 nm determined, and the concentration calculated from the extinction coefficient. This procedure registers all absorbance at 254 nm as the iso acid, and if absorbing impurities, such as humulinic acid, are present, it therefore overstates the true iso acid content. Only by HPLC can the true value of hop acid concentration be determined.

The extinction coefficient will vary for the various hop acids due to differences in molecular weights, analogue composition, and the standards historically used to determine them. For the purposes of this specification, the following numbers are used:

|  | MW | E1%/1 cm | alpha acids |
| --- | --- | --- | --- |
| IA | 353 | 520 | @ 254 nm |
| DHIA | 357 | 475 | " |
| THIA | 361 | 480 | " |
| HHIA | 363 | 460 | " |
| alpha | 355 | 318 | @ 325 nm |

Experimental Method for HPLC Measurements

Hop extracts are diluted to a concentration of about 200–500 ppm total hop acids in methanol. Separations are performed on a Waters 2690 Separations Module with a 996 Photodiode Array. The HPLC column contains octyl reverse phase packing (Zorbax Eclipse XDB-C8, 25×0.46 cm, 5-micron) and was kept at 25° C. The aqueous buffer is 18:82 (v/v) acetonitrile:1% aqueous citric acid buffer (pH 7.0). The citric acid buffer is prepared separately, adjusted to pH 7 with 45% KOH, and filtered before combination with the acetonitrile. The mobile phase program is given in Table D-1. Injection volume is 5 μL.

TABLE D-1

Mobile Phase Program for the HPLC Method

| Time (min) | Flow (mL/min) | % Methanol | % Acetonitrile | % Buffer |
|---|---|---|---|---|
| 0 | 1 | 15 | 15 | 70 |
| 5 | 1 | 15 | 15 | 70 |
| 30 | 1 | 80 | 15 | 5 |
| 33 | 1 | 80 | 15 | 5 |

The detector is set to measure the entire UV absorbance spectrum between 230–400 nm with a resolution of 1.2 nm, filter response of 1, and sampling rate of 1 point/sec. HPLC plots are reported in "maxplot" mode, which reports the maximum absorbance value between 230–400 nm at each point in the chromatogram. Data is analyzed by Millennium® 32 software (version 3.05.01, Waters and Associates). Maxplot chromatogram peaks are quantified with integration settings of threshold=15 $\mu$V/s, filter response=1, and minimum height and area=0.

The % impurities eluting after the hop acid is determined using the % area count at peak maximum. This is because many of the impurities do not have significant absorbance at 254, but peak in the range of 270 nm and above. An extinction coefficient is not needed for this calculation, as it only measures the total area under the peaks at the absorption maximum. The subject hop acids are identified in the traces, as well as the peaks eluting after them, and the instrument calculates the area counts. The relative area counts are independent of concentration of the solution injected into the HPLC.

The cis and trans isomer peaks are defined in the HPLC traces of FIGS. 3 to 6 for DHIA, and FIGS. 7 to 10 for HHIA. Since the prior art has not investigated the relationship of these peaks, the authors have designated these peaks as trans or cis, as defined in Example 10. The definitions provided by the Figures show the critical differences between the prior art and the novel products described in this specification.

Haze is measured by the American Society of Brewing Chemists procedure Beer 26.

Equivalents of a substance are molar.

Yields are based on an average molecular weight of the mixture of analogues.

Infra-red (IR) spectra are useful for demonstrating the different chemical composition of the pure hop acid and the haze forming substances which do not absorb uv light. For the purposes of this specification, they are defined as "waxes." These are isolated and the spectra described in Example 11.

GENERAL DESCRIPTION OF THE INVENTION
The Novel Process and Product

Examples 1 thru 4 show variations on the preferred process for making a high trans, highly soluble DHIA and HHIA which, in turn, do not form hazes upon dilution to 1% in distilled water..

It will be noted that none of these products form insoluble precipitates on standing, and that they may be added directly to soft water to whatever concentration the brewer desires. It will also be noted that they do not form precipitates visible to the unaided eye or measurable haze upon direct injection into bottled beer. None of the prior art products have these qualities. Goldstein's NILUPs-free type DHIA all cis products and the all cis HHIA products presently available do not form clear solutions.

The purity of the hop acids must be exceptionally high if solutions of the high trans product are to remain clear. Substances eluting after the hop acid in the HPLC procedure must be less than 6%, preferably less than 4%, and most preferably less than 1% to 2%. Likewise, "waxes" which do not absorb uv light and which are hexane soluble, must be less than 3%, preferably less than 2%, and most preferably less than 1%.

It is well known to the art that different hop varieties produce different ratios of the three major alpha acid analogues. The lower molecular weight analogues have more solubility than the higher molecular weight ones. As a consequence, the upper concentration limit of the high trans products will vary with hop variety. The concentrations shown in the Examples are considered to be economical to the brewer and suitable for any variety with which the authors are familiar.

The authors can offer no theory as to why a trans to cis isomer ratio of above about 10%, especially above about 20% to 30%, results in the greatly increased solubility of the cis isomers, which, as mentioned in Example 6, are shown to be about 1.5% maximum for equally pure cis DHIA and 0.75% for cis HHIA. In some unknown manner, the trans isomers increase the solubility of the cis isomers from about 1% in water to 10% and more. For example, a 20% solution of HHIA containing 4% trans isomers and 16% cis isomers does not form crystalline precipitates. A 16% solution of cis isomers does. As mentioned above, the solubility of the cis isomers alone is about 1%. The effect of the trans isomers upon the solubility of the cis isomers' solubility is contrary to expectation, since the higher the solute content, the lower should be the solubility of related compounds. This effect cannot be a simple result of the analogue mixture, since the analogues are the same for the cis and trans forms. However, it is also preferred that the claimed products contain the approximate mixture of analogues found in the parent hop. Neither of these critical elements-the high trans isomer ratio combined with all of the parent hop analogues—have grounding in the prior art.

Edible anti-freeze substances, such as ethanol, propylene glycol, and glycerine may be added to the inventive products if they are to be exposed to below freezing temperatures.

In the process, buffering agents other than potassium phosphate may be used. These include sodium and other phosphates, as well as borates and citrates. Details concerning the required process parameters are discussed in the Examples.

When the claimed products are dried, they form amorphous solids which can readily be rehydrated to form aqueous solutions with the properties of the original aqueous solutions. Dehydration can be performed by techniques known to the art, such as spray drying or by evaporation of water under vacuum or even at atmospheric pressure.

The claimed product is differentiated from prior art products by its high trans isomer content, the trans isomers being at least about 10% of the cis isomers (a trans to cis ratio of 10%), and preferably 20%, and most preferably above 30%. It is further differentiated by the absence of substances which elute after the DHIA or HHIA by HPLC analysis, such substances consisting of artifacts and by-products of the reduction reaction. These substances interfere with the clarity of the aqueous solutions of the products. The products are further differentiated from the prior art in that substances which are soluble in hydrocarbon solvents and not detected by the HPLC procedure are essentially absent.

Furthermore, the products form stable single phase aqueous solutions at pHs substantially below the 10.5 to 11 minimums of the prior art, for example between about 7 and 9.5, and are not dependent upon a 35% hop acid concentration, as shown by Westermann, to make a pourable liquid product. The solutions are stable at concentrations in the range of about 5% to 40%. While the instant products are preferably maintained at a pH below about 9.5, they are also stable at the pHs of the prior art.

In addition, the products form clear, non-hazing solutions in distilled water at concentrations of 1% to about 5% and more. Prior art products require raising the pH of the water to above 10 to effect dispersion of a 1% solution, and even then haze forms upon standing. They form gums and precipitates when added to distilled water. This simple test is one means of determining if the product meets the analytical requirements described above and in the claims.

The procedures by which these products are made combine elements of the prior art in a new way, so as to achieve the high trans ratio product. Unlike the Koch and Worden prior art, which uses about two or more molar equivalents of borohydride to achieve reduction and light stability, the herein disclosed novel procedure requires less than about 0.81 molar equivalents. Unlike the prior art conventional pHs of above 13 of Westermann, Todd, Goldstein, and others, who also use less than 0.81 equivalents, the pH during the reduction must be below about 12.4, preferably below about 12.2, and optimally below a pH of 11.2 or even 10.6 for THIA. For IA, the upper pH should be below about 11.8, and preferably below 11. While these pHs, which are well below the prior art, result in some borohydride decomposition which the prior art pHs above about 13 to 13.5 deliberately avoided, the low pH is critical to the trans isomer formation. The high pH of the prior art resulted in essentially all cis products, which are inherently of very low solubility. As little as 0.4 molar equivalents of borohydride may be used, but the range of about 0.55 to 0.65 is preferred. When the large excesses of borohydride, such as shown in Worden, are used, over-reduced and other by-products are formed and the actual yield of reduced DHIA or HHIA is so small as to make analysis problematic and the elimination of haze forming substances very difficult if not impossible.

Reaction temperatures below about 85° C. are feasible, the reaction taking longer at lower temperatures. The preferred range is about 40° to 75° C.

The reduction should be terminated before a significant amount of trans isomer is converted to the cis form. This occurs more rapidly at high pHs and temperatures. The analytical procedures described herein provide a guide to termination times.

Combining purification steps with the novel reduction conditions discloses how heretofore unidentified haze and precipitate forming substances can be removed. These purification steps address substances eluting after the DHIA or HHIA by the HPLC procedure (see Definitions and Example 7 of this specification). These post-eluting substances must have a total area count at peak maximums, according to the HPLC procedure, of less than 5%, preferably less than 3%, and most preferably less than 1% of the area counts of the hop acids.

In addition, there are also non-uv absorbing substances, undetectable by the HPLC procedure, which must be critically less than about 3%, preferably less than 2%, and most preferably less than 1% of the weight of the hop acids.

Removal of these unwanted and unidentified substances, called "waxes" in this specification, and not absorbing uv light, is preferably achieved by separating them from aqueous solutions at a pH below 10.5, and preferably below about 8.5 to 9.5, and even as low as 7.5. The concentration of the hop acids in the aqueous phase during "wax" removal is less than about 20%, and preferably less than 15%. Because of the insolubility of the all cis prior art forms at these pHs, separations were done at elevated temperatures (Goldstein) or less than about half of the DHIA was captured into the "clean" phase. As shown by the comparative Westermann and Goldstein examples, yields were poor and sufficient impurities were present to cause haze and precipitation when diluted in distilled water. It is speculated that the presence of the trans forms assists in the separations, and therefore is critical to the "clean-up" procedure. The herein disclosed art gives yields in excess of 75% and up to 85% to 90%.

Separation of unwanted substances is preferably effected using a hydrocarbon solvent, especially of C-6 to C-10, but other water immiscible solvents such as ether or methylene chloride may be used. Less preferably, they may be separated by allowing agglomerates of the substances to form, optionally in the presence of solid adsorbents such as diatomaceous earth, and filtering the solids from the liquid phase. As with the water immiscible solvents, the solid separations are conducted at a pH below about 9.5.

DESCRIPTION OF THE DRAWINGS

Reference is now made to the drawings, wherein.

DETAILED DESCRIPTION OF THE INVENTION

Figure 1:
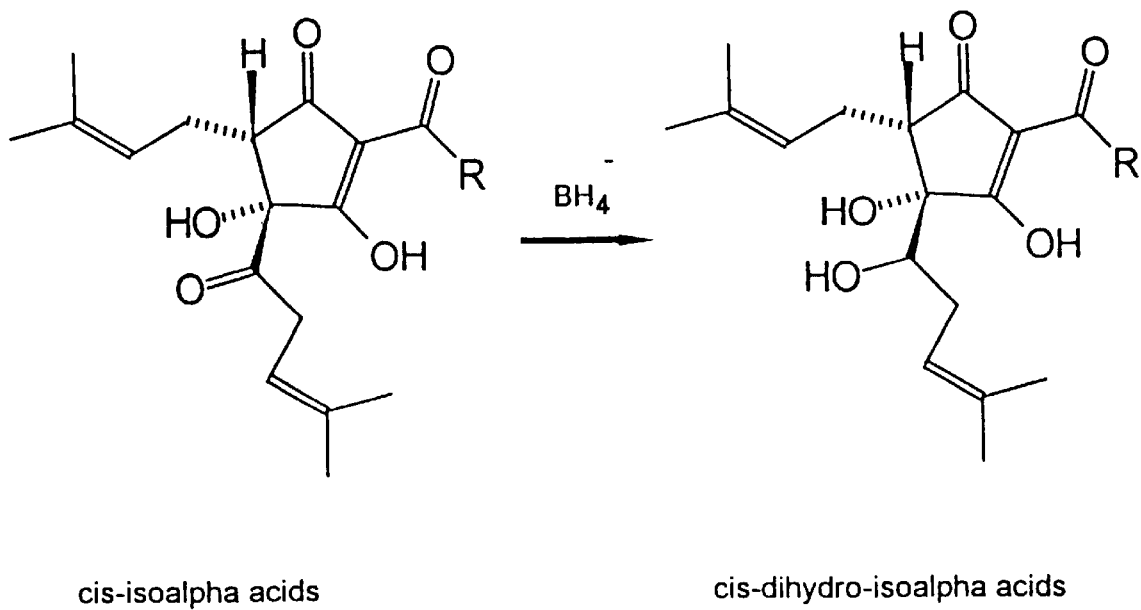
FIG. 1 is a depiction of the structural formulas of cis and trans IA and DHIA.
Figure 1:
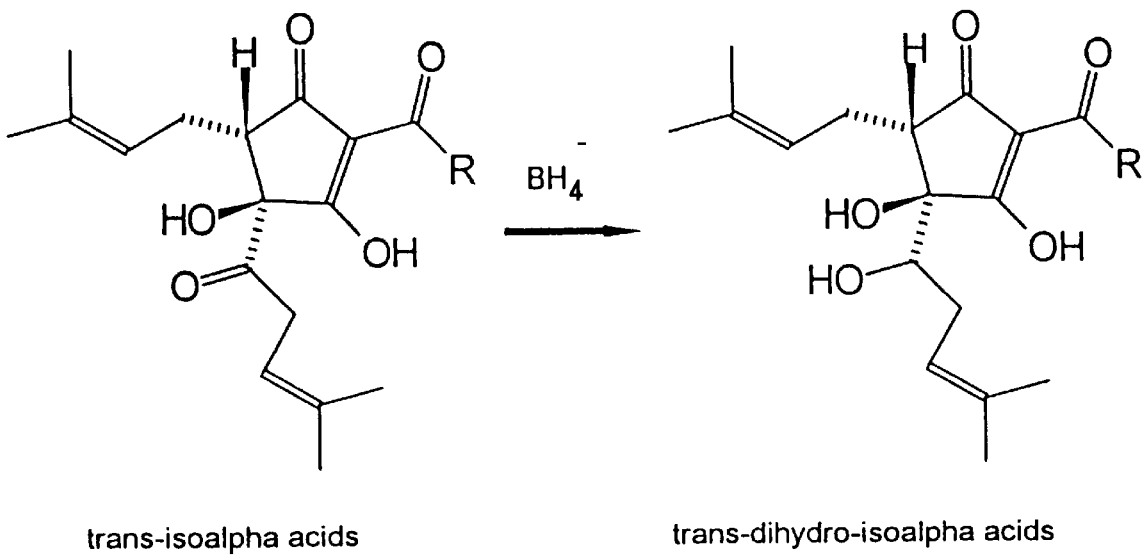

The present invention, in both its method and product aspects, will be more readily understood from the following detailed description, particularly when taken in conjunction with the drawings.

The following Examples are given by way of illustration only, and are not to be construed as limiting.

EXAMPLE 1

Preparation of a liquid DHIA by reduction without the use of solvent in the reducing medium.

52 g of a 29% aqueous solution of IA was added to 100 ml of water and the pH adjusted to 10.5 to improve solubility. 0.87 g of NaBH$_4$ ( 0.55 molar equivalents ) in 75 ml of water were added, the solution heated to about 50° C., and the reaction terminated after two hours. 50 ml of hexane, a C-6 hydrocarbon, was added, and the mixture cooled. The aqueous and hydrocarbon phases were agitated with phosphoric acid at a pH of 2.8, the aqueous phase containing boron discarded, and the organic phase was extracted with water to remove residual boron. The organic phase, containing the DHIA, was then partitioned against 100 ml of warmed distilled water brought to a pH of 8.4 with potassium hydroxide. (A pH of between about 7.6 to 8.8 is optimal for this separation, although higher and lower pHs may be used. Furthermore, concentrations of 20%, preferably 15%, and most preferably about 10% or less in the aqueous phase are suitable for the partition). The aqueous phase was reextracted with hexane to remove "waxes" and other insoluble material. The aqueous layer was then desolventized and concentrated to a 19% solution under vacuum. The 19% DHIA solution remained single phase, without precipitates, was 86% DHIA with 2.2% post-DHIA impurities as measured at peak maximums by HPLC. Approximately 11% of the area count at peak maxima was contributed by pre-DHIA peaks, which do not interfere with the solubility of the DHIA. The 19% aqueous solution was soluble with complete clarity at all concentrations in distilled water, and the trans isomers HPLC area count was 33% of the cis isomer area count (trans:cis ratio equals 33%). The yield was 74%. Upon dilution to 10% with distilled water, the 19% solution remained clear, single phase, and without precipitates, unlike any prior art product.

The unexpected result of this procedure is the high percentage of trans to cis isomers, well above that of about 0 to a maximum of 5% for commercial DHIA and the prior art examples. This ratio is critical and is associated with the outstanding solubility at close to neutral pHs, as well as complete clarity in water and upon injection into beer (See Example 9). This product is new to the art.

A more difficult method of obtaining a desirably soluble DHIA, with a high trans isomer content, is to eliminate the use of a water immiscible solvent during boron removal. This makes it more difficult to eliminate all the boron. Charcoal and silica gel and other adsorbents are useful alternatives for water immiscible solvents for removing the substances which detract from the clarity of the soluble DHIA solutions. Lower alkanols, such as methanol, ethanol, and isopropanol may be present in the reaction medium. They will speed the reaction, but will also decrease the ratio of trans isomers.

Critical to the solubility and clarity of the DHIA is the high proportion of trans isomers, heretofore absent in DHIA products. Also critical to the clarity is the substantial absence of substances eluting after DHIA by the HPLC methodology described in the specification, as well as the absence of "waxes.".

The prior art products, consisting of 35% DHIA aqueous liquids wherein the hop acids are substantially free of trans isomers, as in the prior art examples below, are insoluble in water, and form a haze following addition to pH 10 water.

EXAMPLE 2

Preparation of DHIA from IA with the use of solvent.

500 g of a 25% (measured by total absorbance at 254 nm) aqueous solution of crude IA was added to 250 ml of a 4% solution of $NaBH_4$ (0.75 molar equivalents). The pH was 11.4. 125 ml of limonene, a C-10 hydrocarbon, was added, and the mixture heated with agitation for 3 hours at 70–75° C. The mixture was cooled, and the organic phase separated from the aqueous DHIA phase. The organic phase was discarded. 200 ml of a light petroleum distillate (boiling point less than 100° C.) was added to the aqueous phase, and the solution acidified to pH 2 with phosphoric acid. The aqueous phase was separated and discarded. The organic phase was washed once with water at a pH of about 3, and again at a pH of about 4 to 5 to eliminate all boron. The organic phase was then partitioned with 1000 ml of distilled water brought to a pH of 7.6 with potassium hydroxide and the phases separated. The aqueous DHIA phase was concentrated under vacuum to 20% DHIA, during which process all residual limonene was removed. The DHIA had a trans:cis ratio of 24% as measured by HPLC area counts. The absorbance, as measured at peak maxima, of the post-DHIA eluting substances was about 2.0 to 2.5% of the total DHIA area count. (The post-DHIA eluting substances were about 9.9% in the crude reaction mixture prior to partitioning. This shows the effectiveness of the partition in removing the unwanted, haze forming impurities). The yield was about 70% of the crude IA.

The 20% aqueous DHIA solution remained clear and without crystallization for more than three months. It formed clear solutions at all concentrations when diluted in distilled water.

Lower alkanols, such as methanol, ethanol, and isopropanol may also be present, and they will accelerate the reduction reaction. Because of their cost, they are not preferred.

EXAMPLE 3

Preparation of a soluble HHIA.

280 g of a 42% pH 10 aqueous solution of commercial THIA ( 117 g=0.32 moles) was added to 420 ml of distilled water. The resulting pH was 10. Then 7.4 g of potassium borohydride (0.195 mol=0.61 mole eq) was added with agitation, and the mixture was stirred for three hours while heated to 70° C. The reaction mixture was cooled, 200 ml of hexane added, and the pH reduced to about 2 by the addition of phosphoric acid with agitation. The lower acidic phase, containing boron, was discarded; the hexane phase washed once at a pH of about 2, and then with water. Although preferable, it is not essential that hexane be used during the boron removal procedure.

The HHIA was recovered from the hexane solution by partition into water with dilute KOH to a pH between about 6.5 and 8.5, preferably and in this example about 7.5, to form an aqueous solution of HHIH. The concentration was about 10%. Its optional range is about 5% to 15% and less preferably 20% HHIA. The organic phase was separated from the aqueous HHIA phase and discarded. The aqueous phase and about 10% by volume of hexane were heated to reflux with agitation. Temperature is preferably elevated, and can be the reflux temperature of hexane or other water immiscible solvent, the reflux temperature being easily controlled. This assures that any residual insoluble substances are removed from the aqueous HHIA phase. This includes "waxes", which do not absorb in the uv range and therefore are not detected by HPLC. (See Example 11). The organic phase was again separated and discarded.

The aqueous phase is then concentrated to any desired % HHIA by removal of water under vacuum, which also assures removal of any residual solvent.

In this example, the resulting aqueous phase was 13.4% HHIA by uv. The peaks eluting after HHIA were 1.77% of the HHIA peaks by area count at peak maximum, and HHIA was 92.1% of the area count at peak maximums. The balance was material eluting prior to HHIA, which does not interfere with the solubility. It had a trans:cis ratio of 98%. It did not form precipitates on standing for three months.

The clear liquid 13.4% aqueous HHIA solution was made to 1% in distilled water, pH 7.5, and was clear. The 1% solution did not form a haze or particulates upon injection into beer at commercial use rates of 10 and 20 ppm. Typical foam enhancement and flavor profile in the dosed beers were observed by a trained panel.

HHIA with the above solubility characteristics and a trans:cis ratio of above 10% may also be made by catalytic hydrogenation of DHIA with a tran:cis ratio of above 10%. However, this is not a preferred procedure.

EXAMPLE 4

Reduction of THIA to HHIA in a buffered system.

20 g of a 20% concentrate of commercial THIA, containing precipitates, and dark brown in appearance, was diluted with water to a concentration of about 2% and the pH adjusted to 10. One-half volume of a 2.5% potassium phosphate solution containing two hydrogen equivalents (0.5 molar equivalents) of $NaBH_4$ was added. The reduction was carried out over a three hour period, increasing the temperature from ambient to 70° C. during the course of the reaction. The resulting buffered pH was between 11.7 and 11.9. Insoluble material formed during the procedure. At the end of the reaction, the aqueous phase was separated from the insoluble gums, about one-half volume of hexane added, and the pH lowered to 2 with $H_2 SO_4$ with agitation. The aqueous phase was discarded. The hexane phase was reextracted at pH about 3 and then with water, pH 4, to remove residual boron. The hexane-organic phase was then extracted into 100 ml of water by adjusting the pH to about 8 with 10% KOH. The aqueous phase was reextracted twice with hexane, which was discarded. The aqueous phase was then rotovapped to provide a 22.5% HHIA solution by uv. It assayed 85% HHIA by HPLC, with 0.44% post-HHIA peaks, 14.6% pre-HHIA peaks, and the HHIA had a trans:cis ratio of 75%. It remained as a clear, light tan solution without the formation of crystalline materials for more than three months.

The product was soluble in distilled water at all concentrations, and did not form hazes upon standing. Prior art cis HHIA is soluble at <1% in distilled water. No concentrated aqueous solutions of HHIA are available to the present art.

While potassium phosphate is a preferred buffer, other buffers, such as mixtures of citrate and borate salts may be used. The advantage of using a buffer is the maintenance of pH within a narrow range, thus avoiding the effect of variations in pH as the unreduced form is converted to the reduced form, which has a different pKa.

EXAMPLE 5

Compatible single phase liquid, non-precipitating mixtures of soluble DHIA and HHIA with IA and THIA.

As has been noted, IA and THIA do not form crystalline precipitates, perhaps due to their molecular structure. Since the soluble forms of DHIA and HHIA have been unknown to the art, this example is designed to demonstrate the limits of compatibilities of the mixtures. Guzinski U.S. Pat. No. 5,200,227 shows the limits of compatible mixtures of IA, DHIA, THIA, and HHIA which do not form precipitates of DHIA or HHIA on standing. The objective of his invention was to overcome the tendency of liquid solutions of DHIA and HHIA to form insoluble precipitates of the hop acids on standing. His formulations have found limited use in the art, since upon standing precipitates may form, particularly with cycles of heating and cooling such as occur during transportation. Since his DHIA and HHIA did not contain trans isomers, having been made by the then commercial procedures, they were not the soluble non-precipitating products of this invention.

Therefore it is necessary to determine the compatibility limits of the new soluble products with IA and THIA, as is done in this example by combining the different hop acids, as shown in Table 5-I.

TABLE 5-I

Typical Mixtures of high-trans, clear soluble DHIA and HHIA and IA and THIA.

| Mixture No. | Composition, % of Acid | | | | Total conc, % |
|---|---|---|---|---|---|
| | IA | THIA | HHIA | DHIA | |
| 1 | 30 | 70 | | | 18 |
| 2 | | 50 | 50 | | 20 |
| 3 | 50 | 50 | | | 20 |
| 4 | 60 | 40 | | | 20 & 35 |
| 5 | | 57 | 29 | 14 | 18 |
| 6 | | 50 | 50 | | 20 |
| 7 | | 72 | | 28 | 14 |
| 8 | | 66 | 34 | | 13 |

Mixtures of the DHIA and THIA and/or IA were compatible and remained clear liquids at all ratios between about 1 and 99%. HHIA mixtures behaved similarly. Since the high trans DHIA and HHIA are both clear solutions, they may be mixed at any ratio and will remain clear. Preferred upper concentrations are below about 35% to 40%, and those of greatest ease of use in the brewery are between about 5% and 25%. The concentration of the mixtures is not critical to the invention, since any concentration adaptable to practice in a given brewery is feasible.

All solutions were clear upon dilution in water to 1%, except for the mixtures containing 50% or more of IA and THIA. In the latter cases, the haze was due to the IA and THIA, which formed hazes by themselves. These were clear when added to pH 10 water. These mixtures do not form hazes or precipitates upon injection into beer.

In modern brewing, combinations of iso-acids are very useful in designing foam, cling, and mouth feel characteristics into a beer. They provide for much more flexibility than a single hop acid alone. These stable mixtures therefore offer a new and exceptionally practical manner in which such mixtures can be utilized in the brewery.

EXAMPLE 6

Non-crystallizing limits of high trans water soluble DHIA and HHIA.

The essentially "wax" free products made by the procedure described in the above examples were both concentrated and diluted to test their solubility ranges and to compare their performance with prior art products. The samples were allowed to stand at room temperature for a few weeks and, if crystallization occurred, it is noted below. The pHs were 7 to 8. Higher solubility limits are obtained at higher pH's than the range of 7 to 8 used in this example.

| Concentration | High trans DHIA | High trans HHIA | Prior art DHIA |
|---|---|---|---|
| 30–40% | Precipitates | Precipitates | |
| 35% | Precipitates | Sometimes | Prec. Slowly |

-continued

| Concentration | High trans DHIA | High trans HHIA | Prior art DHIA |
|---|---|---|---|
| 20–30% | Some precipitates | No precipitates | Separates and gums |
| 15–20% | Slight precipitates | No precipitates | Separates and gums |
| 10–15% | No precipitates | No precipitates | Separates and gums |
| 5–10% | No precipitates | No precipitates | Separates and gums |
| 1–5% | No precipitates | No precipitates | Hazy and gums |

No prior art product remains a single phase liquid upon standing at these concentrations, at these low pHs, nor does it form a clear solution when added to distilled water, as do the high trans products at the noted concentrations. Prior art 35% DHIA, at a pH of 10 or above, acts as a cosolvent for itself, but will separate at lower concentrations and form gums and precipitates. Prior art HHIA appears to be soluble at 5% or less in pH 10 to 11 water, although the solution is not clear. Both the prior art DHIA and HHIA are insoluble in neutral water and form hazes at 1% or less in distilled water at pH 10 and above. Pure recrystallized cis DHIA has an upper solubility limit of about 1 to 1.5% in distilled water, and pure recrystallized cis HHIA's upper limit is about 0.75% even at pH 10. The presently inventive products form clear solutions in distilled water at the concentrations noted above, as well as below 1%.

If a high trans DHIA or HHIA at a concentration above about 20 to 25%, for example 35% to 40%, is desired to minimize shipping costs, any precipitates can be dissolved easily by dilution and agitation.

It is obvious from the above that the high trans DHIA has very different physical properties than essentially all cis prior art DHIA. The prior art DHIA precipitates very slowly at a 35% concentration, and separates into two phases at less than about 30%. In complete contrast, the high trans DHIA remains without precipitates at concentrations below about 25%. The reason for this difference in physical and solubility characteristics is unknown.

Since prior art all cis HHIA is only soluble to less than about 3% to 5% in water at pH above about 10, the enhanced solubility of high trans HHIA as compared to high trans DHIA at concentrations of 20% to 30% cannot be explained. It is contrary to expectations, in that the hydrogenation of the acyl side chains should reduce its solubility as compared to DHIA with less saturated acyl side chains.

In conclusion, the physical properties in the high trans products, as compared to the prior art cis products, is not consistent with known explanations of solubility characteristics and is an unanticipated and critical aspect of this invention. If the change in physical properties did not occur, the high trans products would have no advantage over the prior art products. Likewise, that 5% or more cis DHIA or cis HHIA in the presence of 1% or more trans DHIA or HHIA should be soluble and non-precipitating is contrary to expectation, as the increased solute content should decrease the solubility of the cis forms. There is no a priori explanation of this behavior.

EXAMPLE 7

Summary of assay and analytical data of clear, highly water soluble, non-precipitating products and prior art products.

It was mentioned in Westermann -188 (col 3, lines 66 to col 4 line 5) that 5% solutions of his DHIA form an aqueous and oil phase on standing. He found, to his surprise, that when concentrated to the range of above about 35% they remained as a stable single phase solution. This co-solvent effect of the hop acids for themselves at relatively high concentrations is also noted in Guzinski -227, who points out that precipitation occurs over time with hard to dissolve crystals.

The new high trans ratio highly water soluble forms of DHIA and HHIA do not depend upon their cosolvent effects for their liquidity, but rather form clear solutions at lower and higher concentrations. They are not dependent upon a cosolvent effect created by a 30% or 35% organic content in the solution. Typical performance at various concentrations was evaluated and the results are shown below. This demonstrates the absence of haze formation when diluted in water. The Table also offers comparatives with prior art Examples in this specification, as well as with a commercial DHIA. As noted in the prior art section, HHIA of the prior art cannot be provided in a usefully high concentration in water, but is provided as a propylene glycol solution.

The suspension evaluated was a microparticulate of Guzinski (PCT/US97/04070).

TABLE 7-I

Comparative Properties of high trans "soluble", suspensions, and liquid hop acid products.

| Example No. | Type | % trans:cis | Impurities | 1% in water |
|---|---|---|---|---|
| 1 | Soluble | 33 | 0.2 | Clear |
| 2 | Soluble | 24 | <2.5 | Clear |
| 3 | Soluble | 98 | 1.8 | Clear |
| 4 | Soluble | 75 | 0.5 | Clear |
| 5 | Soluble Mixtures | >10 | — | Clear |
| 12 | Prior Art | <1 | 6.5–13 | Milky, Curds |
| 13 | Prior Art | 0 | 15 | Milky |
| 14 | Prior Art | 0 | 7.1 | Milky |
| 15 | Prior art | 0 | >5 | Milky |
|  | Micro—particulate | 0 | 5.7 | Hazy |
|  | Commercial 35% | 0 | >5 | Milky |

Conclusions:

Only the products with a trans to cis ratio of substantially greater than the prior art form clear solutions in distilled water, and remain haze free. While the absolute lower limit of the trans to cis ratio has not been established because not all analogue combinations have been evaluated, if it is above about 10–20% the non-crystallizing clear water soluble characteristic is achieved. Ratios of about 10% work in combination with IA and THIA. There is no upper limit, and ratios above about 30–40% and especially 50% are preferred, especially for HHIA.

While not affecting the solubility of the DHIA and HHIA, the impurities have an important effect upon the clarity of the 1% solution.

Therefore the optimal product has a trans ratio above 10%, and preferably above 20%, and especially above 30%, The DHIA and HHIA impurities eluting after the hop acid by HPLC, as measured by area count at peak maximums, are desirably less than about 8%, and especially less than about 5%, and most preferably less than about 3%, and most desirably less than 1%.

EXAMPLE 8

Flavor comparison with prior art products.

The bitterness profiles of the high trans products were shown to be the same as those of the existing commercial types by two techniques, both of which involve dilution of the test material in water at a concentration of 15 ppm.

The first is a triangle test, in which individuals are asked to select the odd sample among three samples presented to them. The results are then subjected to statistical analysis to determine if the samples are different within a 95% confidence limit. This test showed that there was no difference in bitterness between the commercial products and the inventive samples.

The second test is more sophisticated, and tells whether or not the hop acid has the same fading characteristics in the mouth. It is called a time-intensity analysis, and involves the subject tasting a sample in water, and recording the bitterness impression at five second intervals. This provides an analysis of the maximum bitterness perceived, as well as the manner in which the bitterness disappears in the mouth. The inventive high trans to cis ratio sample had the same perceived intensity as one commercial DHIA sample, which was more bitter than a second commercial DHIA sample, but otherwise had the same type of fading curves. All had similarly shaped time intensity curves. High trans ratio HHIA samples also had the same time intensity curves as all cis HHIA.

There is no a priori reason that a high trans ratio product should have the same flavor characteristics as present commercial products, since it contains a critically higher ratio of trans isomers than do existing commercial products, which are all cis isomers. It is well known that different isomers of a substance have different smells and tastes, and the result shown in this example is not predictable by theory.

It was noted that both the DHIA and HHIA commercial samples had an astringency not associated with pure cis DHIA and HHIA in the time intensity analysis. Commercial DHIA has been noted to contribute astringency in light beers, where it is more obvious than in regular beers containing more malt derivatives.

EXAMPLE 9

Comparative clarity and solubilities upon injection into beer.

The products of the above examples were directly injected into a commercial beer at brewing cellar temperature of about 4–8° C. Because the Guzinski PCT suspensions were too thick to inject directly, all formulations were diluted to 1% concentration prior to injection. The prior art products, including the microparticles of Guzinski, did not form clear solutions upon standing, even though the pH of the solutions was above 10, and was substantially above that of the high trans to cis isomer ratio DHIA and HHIA solutions (pH about 7 to 8). Following injection of 20 ppm of the hop acid, the bottles were shaken, held overnight, and haze measured using a clear glass bottle. The increase in FTU haze units is shown below in Table 9-1.

TABLE 9-1

Behavior of products upon injection into beer.

| Example | Product | FTU | In Beer Precipitates | Aq. Solution Clarity |
|---|---|---|---|---|
| | HHIA | | | |
| 4 | Micro Particulate | 20 | Yes | Hazy |
| | Trans:cis 32% | 0 | No | Clear |
| | DHIA | | | |
| 12 | Commercial | 50 | Yes | Hazy |
| 15 | Westermann | >50 | Yes | Cloudy |
| 1 | Goldstein | 30 | Yes | Very hazy |
| | Trans:cis 20% | 0 | No | Clear |

Mixtures of the high trans ratio DHIA and HHIA solution with IA and THIA do not affect the turbidity of the resulting beer unless the IA and THIA are impure and create turbidity by themselves. In that case, the increase in FTU is caused by the IA and THIA.

Conclusions: The prior art products produce significant haze when dosed into beer. This behavior is exhibited even when they are dosed in as 1% solutions at pH 10, whereas the high trans solutions of the herein described products are not affected by the pH of the dosing solution. This makes the high trans:cis ratio DHIA and HHIA preparations uniquely suitable for post-final filtration addition to beer. As a consequence, the hop acids are not removed along with the haze forming substances upon filtration, and the utilization (recovery in the beer) will be in the 90–100% range rather than 50–70% range.

EXAMPLE 10

Comparison of HPLC differences between commercial all cis hop products and the novel high trans isomer DHIA and HHIA products.

Figure 3:
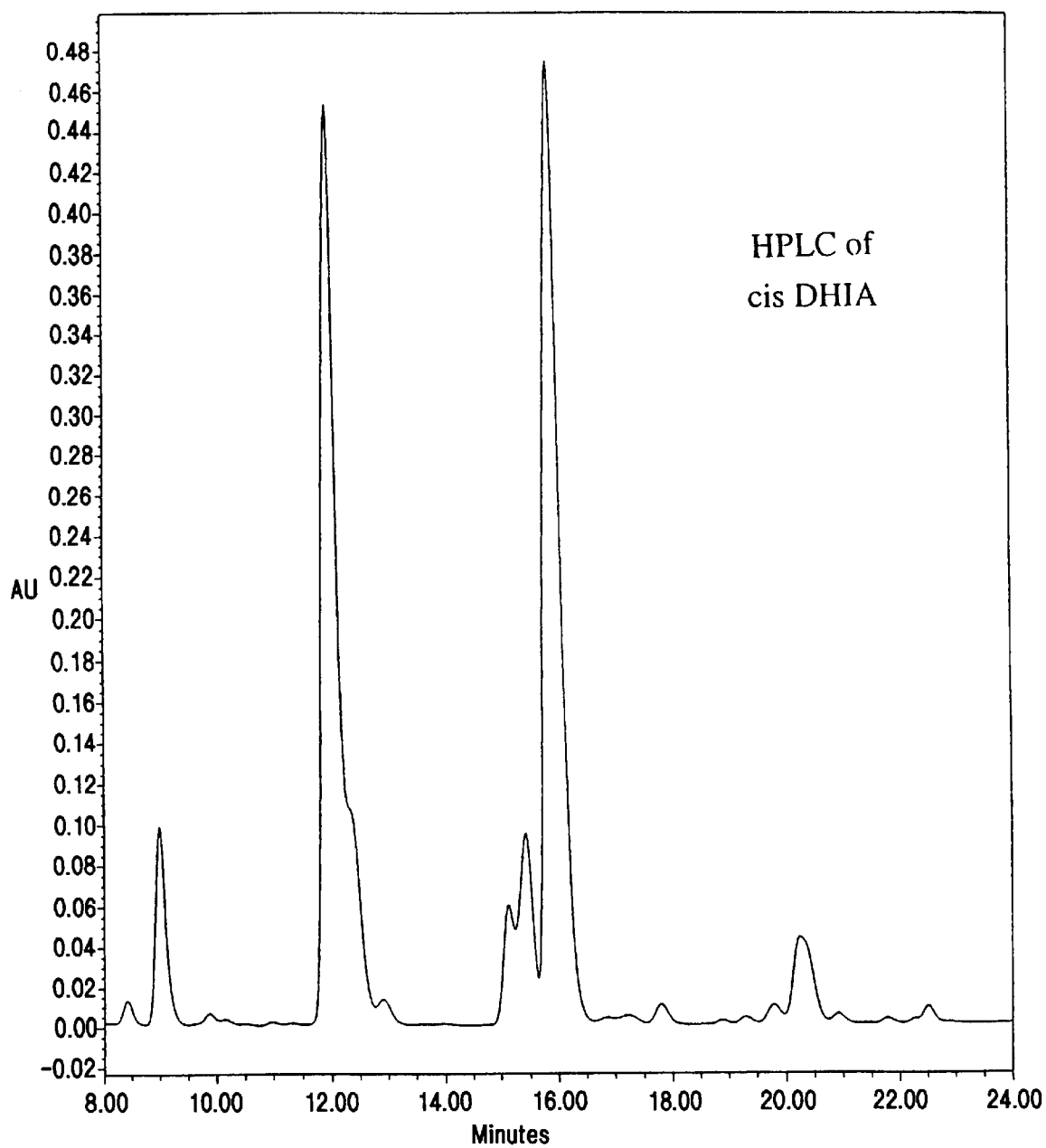
FIG. 3 is a trace of a HPL Chromatogram of typical prior art all-cis DHIA plotting absorbance units against time.
Figure 4:
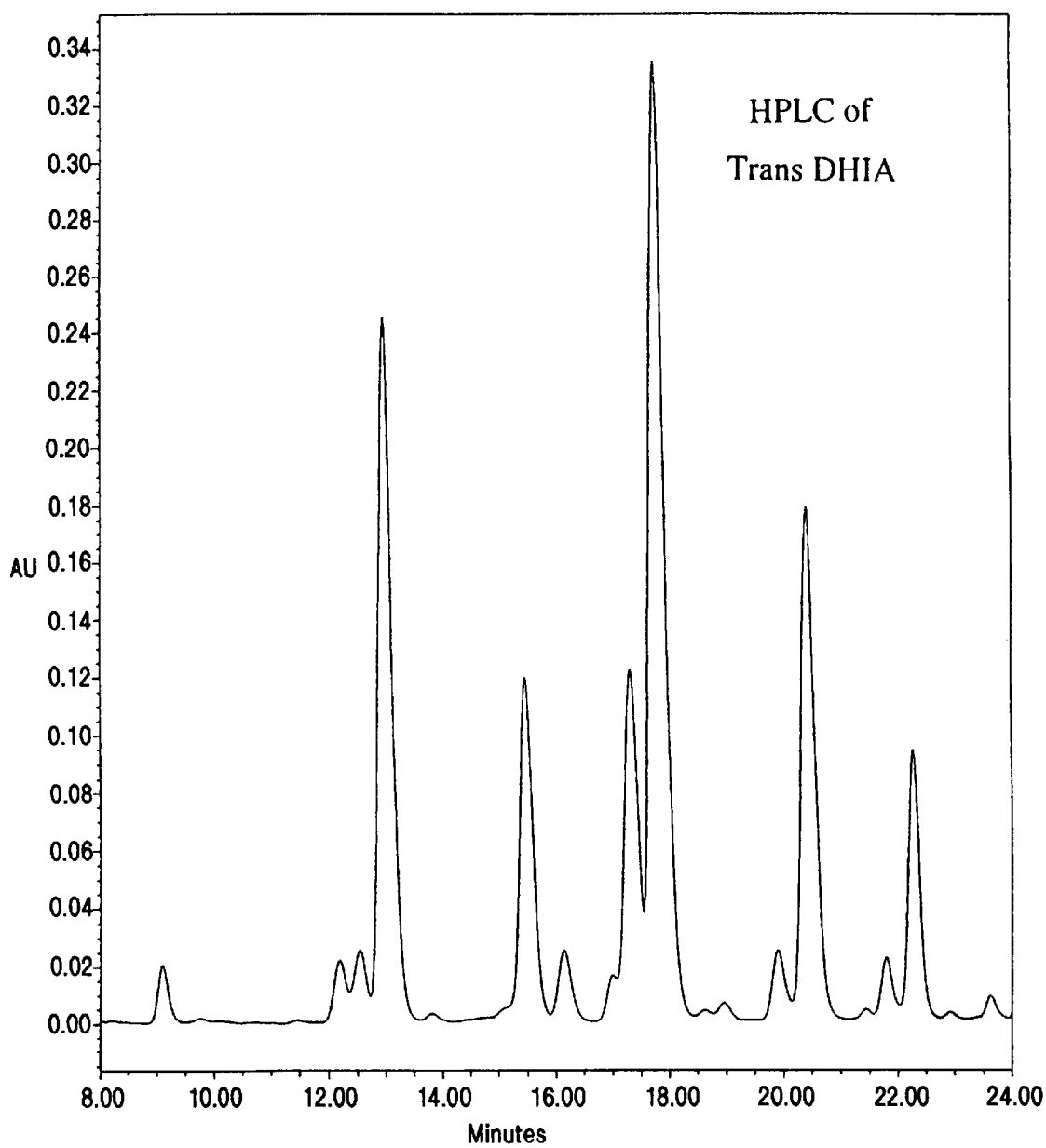
FIG. 4 is a trace of a HPL Chromatogram of trans DHIA plotting absorbance units against time.
Figure 5:
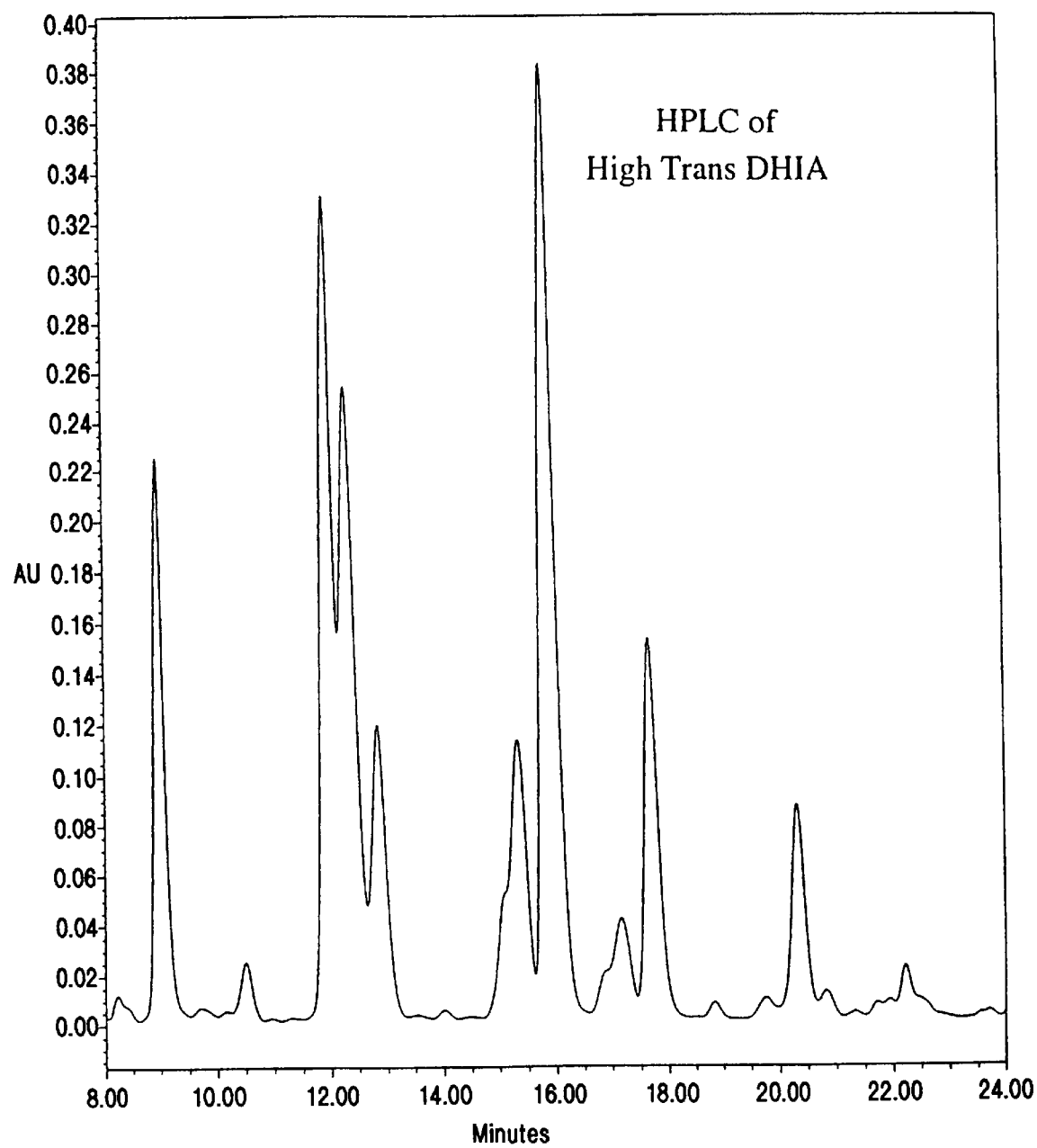
FIG. 5 is a trace of a HPL Chromatogram of high trans DHIA plotting absorbance units against time.
Figure 6:
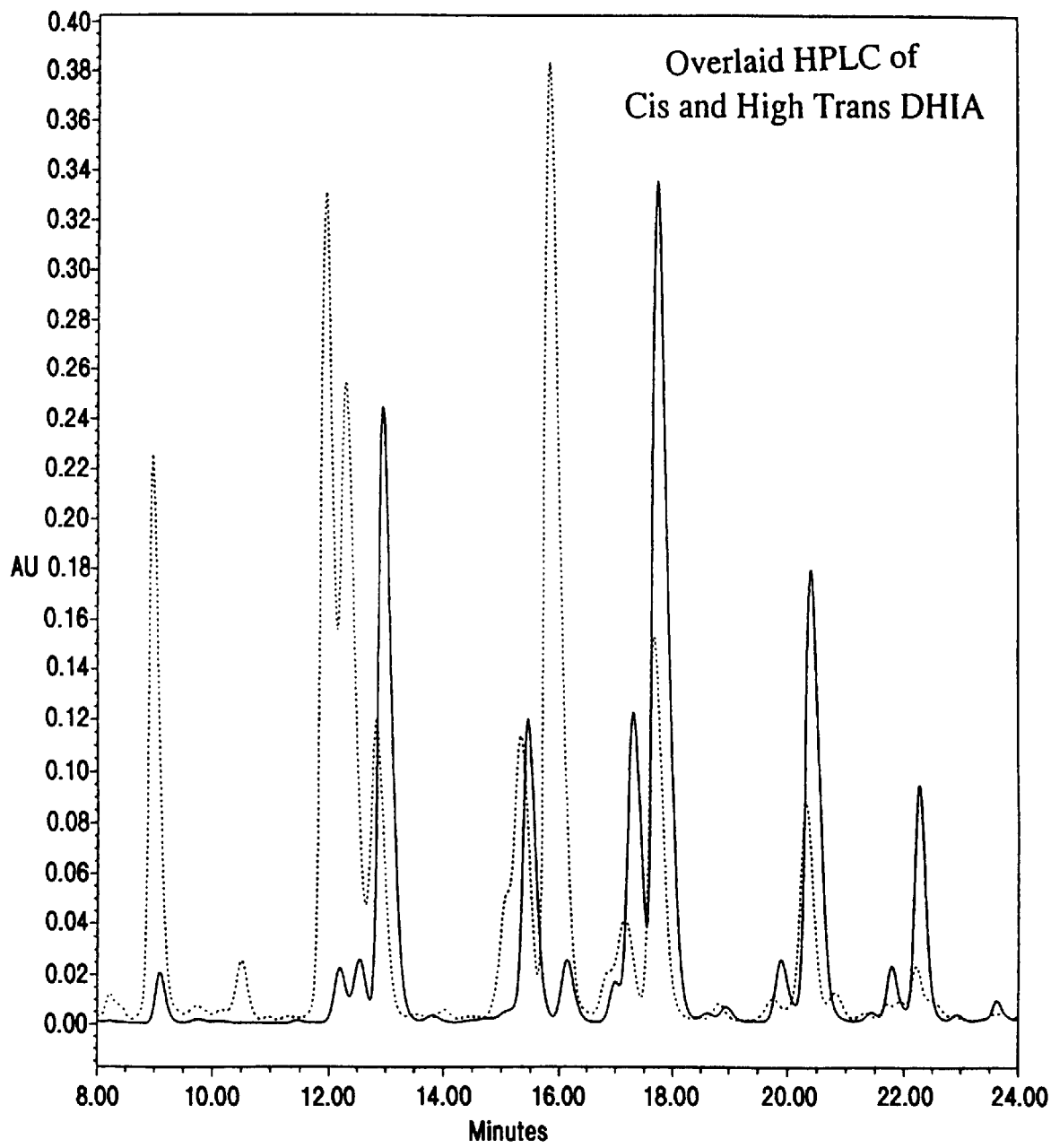
FIG. 6 is an overlay of the chromatograms of FIGS. 4 and 5.

FIG. 3 is an HPLC trace of a typical prior art all cis-DHIA. FIG. 4 is a trace of trans DHIA, which contains a very small amount of cis. FIG. 5 is a trace of the new, highly soluble, high trans DHIA. FIG. 6 is an overlay of FIG. 4 and FIG. 5, in which the solid line is the trans product, and the dotted line is the new high trans soluble product.

Figure 7:
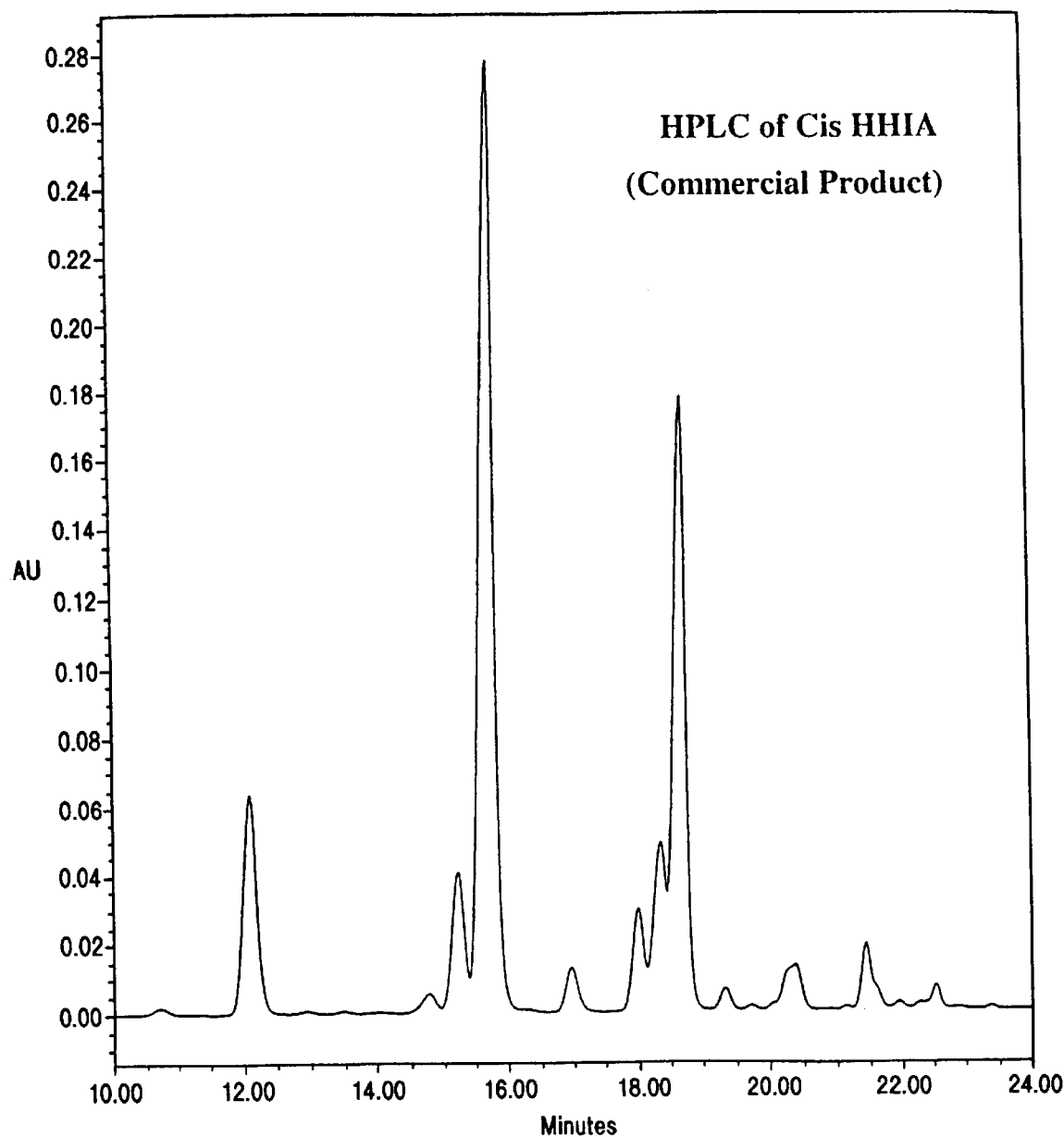
FIG. 7 is a trace of a HPL Chromatogram of a cis HHIA commercial product plotting absorbance units against time.

FIGS. 7, 8, 9 and 10 show the comparable traces for HHIA. FIG. 7 is the trace of the prior art HHIA, FIG. 8 of all trans HHIA, FIG. 9 of the new high trans HHIA, and FIG. 10 an overlay of FIG. 7 and FIG. 9.

Figure 8:
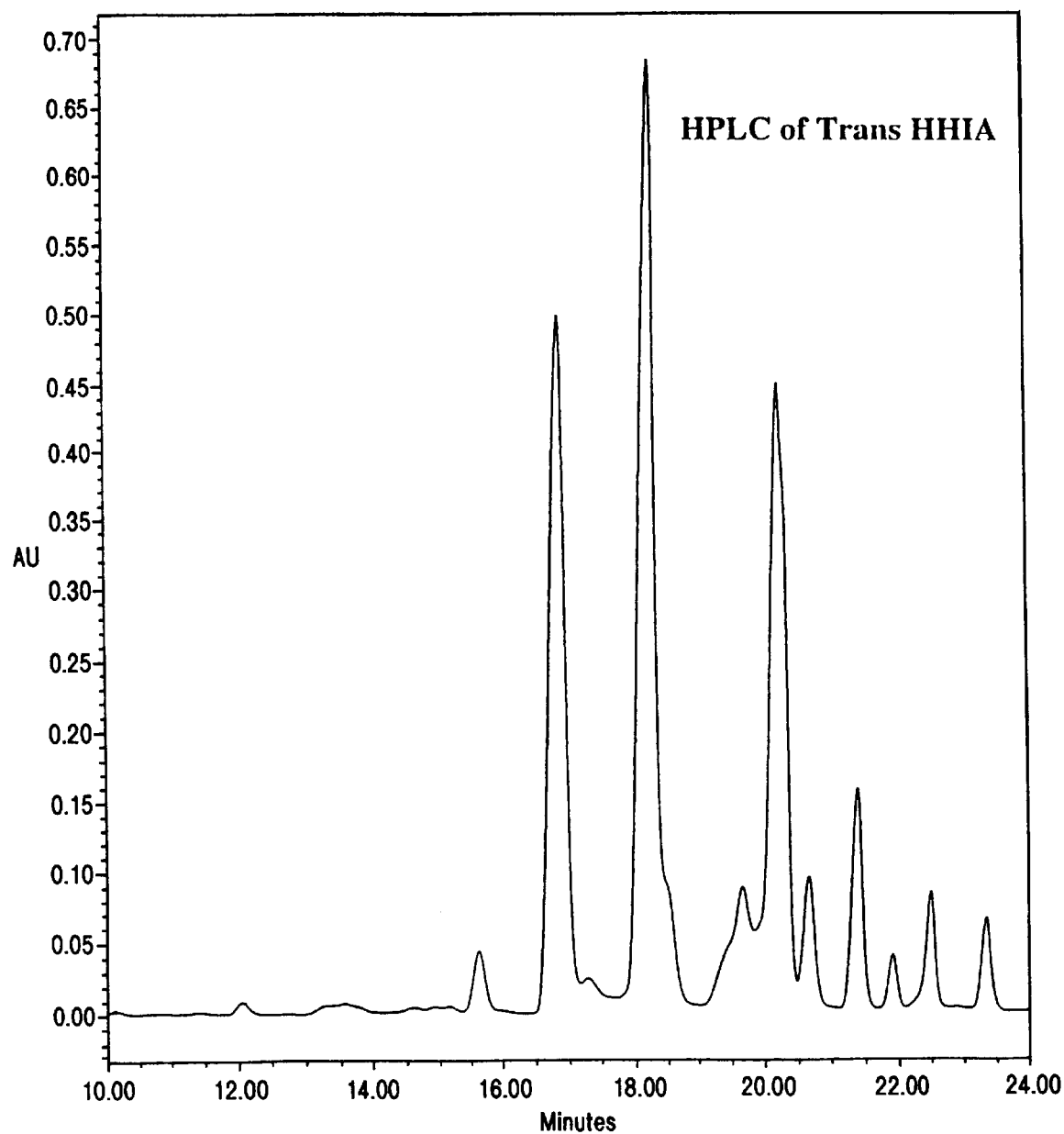
FIG. 8 is a trace of a HPL Chromatogram of trans HHIA plotting absorbance units against time.
Figure 9:
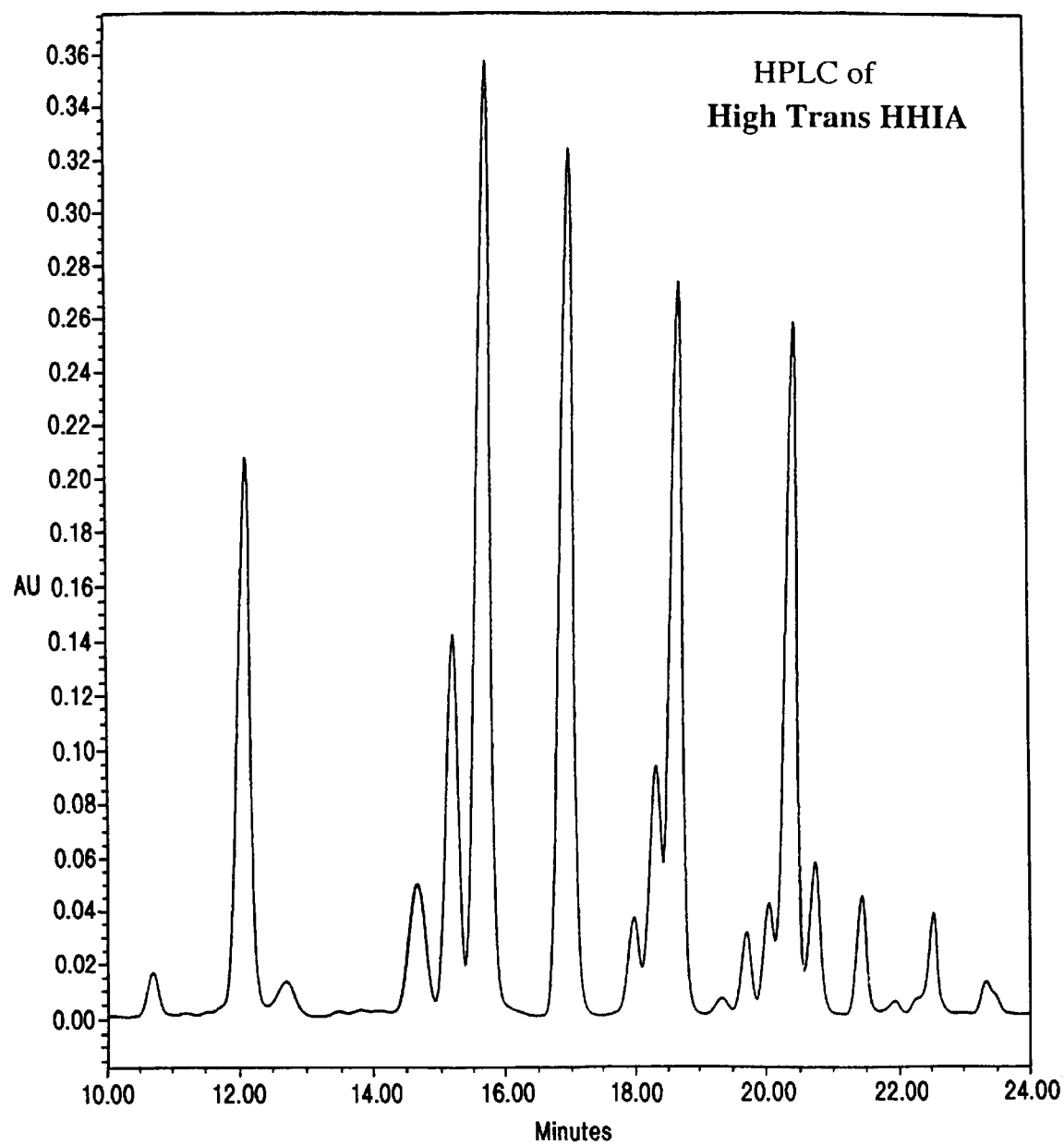
FIG. 9 is a trace of a HPL Chromatogram of high trans HHIA plotting absorbance units against time.
Figure 10:
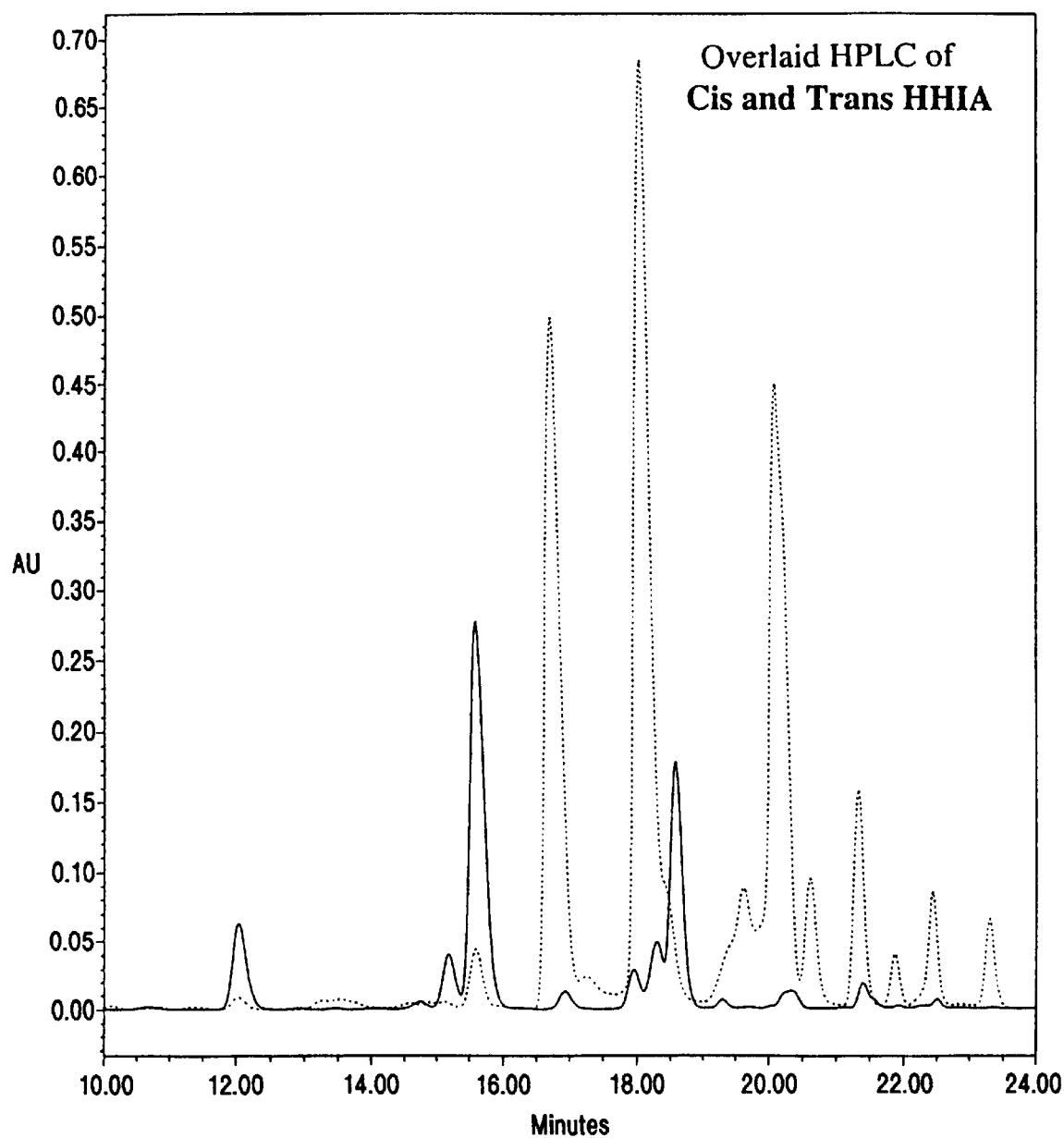
FIG. 10 is an overlay of the chromatograms of FIGS. 7 and 9.

The peaks designated as trans in FIG. 4 and FIG. 8 were made by separating trans IA and THIA by procedures known to the art, and reducing the trans IA and THIA under the conditions of Examples 1 to 4, which do not epimerize trans isomers to cis isomers. These reduced products contained essentially only the trans peaks. It is known that trans isomers convert to cis isomers upon refluxing at pH 12.5 in water. Their identity was further confirmed by using this procedure to produce the cis forms.

It is obvious that the new high trans DHIA product of FIG. 5 has a large peak, eluting at about 12½ minutes, which is present as a shoulder in the all cis product of FIG. 3, and essentially absent in the all trans DHIA of FIG. 4. This peak is an n-analogue cis-stereoisomer which becomes the 16 minute n-analogue cis isomer upon heating at a pH above that used to make the high-trans product. It will be noted that this peak is very evident in the overlay of FIG. 6. Its presence does not affect the identification of the trans peaks. Likewise, the 9 minute co-cis isomer is more slowly transformed to its 12 minute co-cis isomer at an appropriately higher pH.

The differences in the new products and prior art products are clear upon examination of the overlays.

It is the area count of the trans peaks, divided by the area count of the cis peaks, multiplied by 100, which gives the per cent trans:cis ratio.

The above chromatograms were run on the same instrument, with the same eluting solvent and column, on the same day. It is well known that the retention times of the individual compounds will change with changes in column conditions. However, the relative positions of the peaks will not change if the same type of column and eluting solvent is used. (See "Experimental Method for HPLC Measurements".)

Peaks appearing after the last trans isomer are those which are considered post- DHIA and HHIA impurities. Since there are many of them, all with very low area counts in these purified products, they look and are insignificant. In unpurified product, such as commercial DHIA, or an unpurified product, they would be clearly visible and represent about 8% to 15% and more of the area count.

EXAMPLE 11

Separation and analysis of "waxes", and haze contributed thereby.

One group of substances which cause a haze when the inventive product is added to water at a pH below about 8 does not absorb in the uv or visible spectra, so they do not show up in an HPLC purity analysis. For the purposes of this specification, they will be called "waxes," although their chemical composition remains unknown. Separation, haze formation, and infra red spectral analysis of the "waxes" is described below.

A. Separation of Haze Forming Substances from HHIA 227 g of a 20.7% clear solution of HHIA (44.6 g of HHIA) with a % trans:cis ratio of 77, and which formed a hazy solution when added to water at a 1% concentration was the starting material. It was agitated in sufficient water to give a 10% concentration, which was also hazy. The pH was adjusted to 8.3 with KOH and the temperature raised to 80° C. with agitation to effect clarification, cooled to about 60°, and agitation continued while 112 ml heptane was added. It was stirred for 10 minutes. The aqueous phase was separated from the interphase and heptane phases, and the combined interphase precipitates and heptane evaporated to dryness to give 7.72 g. This contained 3.3% HHIA by uv. This in turn was dissolved in methylene chloride, which was back washed three times with alkaline water to remove the trace of HHIA, and an aliquot of the methylene chloride solution evaporated to dryness. These "waxes" were submitted for IR analysis.

The aqueous phase was concentrated to 12% HHIA, which removed residual heptane. It formed a clear 1% solution in distilled water, without the formation of hazes upon standing. This demonstrates that the haze forming "waxes" had been removed, and the HHIA will not form haze upon injection into beer as a 1% aqueous solution, which indeed is the case. The "waxes" by themselves caused a haze measured at 30 FTU when 2 ppm were injected as a 1% alcoholic solution into beer.

Discussion:

The conventional dewaxing is done by separating insoluble materials from solutions of HHIA at concentrations above about 15% to 20%. To remove the last traces of haze forming substances, it is preferable to dilute the HHIA to less than 15%, preferably 12–14%, and most preferably below about 10% concentration. Unless the solutions are dilute, more than three extractions of the aqueous phase with the organic solvent are required.

It is considered, based on this experiment, that the HHIA acts as a cosolvent for the "waxes," which is why HHIA concentrations of less than about 15% facilitate their removal This is why they have not been successfully removed from the prior art all cis isomer commercial products.

B. Separation of a Mixture of DHIA and Haze Forming Substances

A pH 7.8 DHIA solution with a % trans:cis ratio of 42 was extracted twice with hexane at a concentration of about 15% and the aqueous phase separated from the organic phases. The organics were discarded and the aqueous phase concentrated and desolventized to give a clear 20.7% solution. 227.6 g of this clear solution was diluted to a 10% concentration in water. The solution remained clear. Upon dilution in water to 1%, it developed a very slight haze. It was then warmed to 60° C. to effect dissolution of any residual "waxes" which had been dissolved in the clear 20.7% solution due to the high DHIA concentration, 100 ml of hexane was added, the mixture stirred ten minutes, and then cooled. The interphase and hexane phases were evaporated to dryness under vacuum, and 0.42 g of solids recovered. These assayed less than 0.89% DHIA by uv. The solids were dissolved in methylene chloride and backwashed three times with alkaline water to remove any residual DHIA. The solution was evaporated to dryness and the solids submitted for IR analysis.

The separated aqueous phase was reduced in volume under vacuum to remove residual hexane, and diluted to 10% and 1% in distilled water. No haze formed upon standing, showing that the haze forming waxes had been removed. Injection of the 1% DHIA solution into beer did not cause an increase in FTU at 10 ppm, whereas the waxes caused an increase of between 10 and 20 FTU at 2 ppm when injected as a 1% alcoholic solution. This again demonstrates that when the purified product does not throw a haze in dilute aqueous solutions, it will not cause a measurable haze when injected into beer. After the aqueous solution was concentrated to 12% DHIA, it remained as a clear solution and did not form precipitates. It produced a clear 1% solution, without later haze formation, in distilled water, thereby demonstrating that the haze-forming substances had been removed. Upon injection of 20 ppm as a 1% alcoholic solution into beer, no haze was formed as measured in FTU, and none was visible to the eye.

Discussion.

Concentrations of 25% and more have been used in conventional processes for removing impurities from these hop acids. This solubilization of waxes has not been noticed by the prior art, and explains why prior art workers have attributed residual haze as due to the solubility limits of cis DHIA and HHIA, which indeed are in the 1% range for their all-cis isomer forms. This experiment shows that the solubility of "waxes" in the more concentrated high trans:cis isomer ratio products causes haze formation unless they have been removed. Optimal pH ranges for wax removal are between 7.5 and 10.5, the range 8.5 to 9.5 being best.

It is also apparent that the removal of the "waxes" is required if clear HHIA and DHIA solutions are to be formed.

If more than about 2% to 6% of the haze forming waxy substances are present, both HHIA and DHIA will form hazes and their concentrated solutions will form gummy sediments on standing. Therefore to prevent separation, a "wax" content, as a per cent of the hop acid, of less than about 6% is an essential. To form a haze free solution, less than about 2%, and preferably less than about 1%, is a requirement. The level at which they may be tolerated is, of course, determined by the increase in haze which is acceptable to the brewer.

While the use of a water immiscible solvent is a preferable means of "wax" removal, if a brewer can tolerate some increase in haze it is feasible to eliminate the solvent and either filter off the insoluble materials from a dilute hop acid solution, or allow them to form a sediment. This may result in a wax content of up to about 6%, which will cause an increase in haze in the finished beer. However, if the beer is already hazy, this may not be harmful.

C. HPLC Analysis and Infra Red Spectral Analysis of the "Waxes"

HPLC separations and IR spectra were run on both the DHIA and HHIA "waxes".

The "waxes" did not contain measurable amounts of DHIA or HHIA by HPLC.

The IR spectra were obtained on a Perkin Elmer 1710 FTIR spectrometer using thin films of the "waxes" cast on KBr windows. The spectra showed the presence of OH groups at 3200–3600 and 1000–1300 $cm^{-1}$; aliphatic CH groups at 2800–3000 $cm^{-1}$, and carbonyl CO groups at 1600–1750 $cm^{-1}$. The OH and carbonyl CO stretching bands are greatly enhanced in pure samples of DHIA and HHIA, while the "waxes" have significantly more absorbance between 2800 and 3000 $cm^{-1}$. This is interpreted to mean than the "waxes" contain substantial amounts of aliphatic hydrocarbon moieties in the form of fatty alcohols, which are absent in the pure hop acids. These aliphatic hydrocarbon moieties explain the haze forming potential of the "waxes".

EXAMPLE 12

Comparative with Westermann U.S. Pat. No. 3,558,326 and 3,965,188

Westermann builds on the work of Koch, who showed DHIA in alcoholic solutions which, when added to wort, improved the light stability of beer. Westermann's objective was to provide a DHIA fraction suitable for post-fermentation addition, and of improved purity.

His first patent showed an improved process for making DHIA, and his second patent took that a step further and separated fractions of increasing DHIA purity for post-fermentation use.

This example shows why Westermann does not anticipate or suggest this invention, since his product had neither the purity he claimed, would not perform like the product of this invention, nor had the same physical properties.

In his procedures, he prepares a feed stock in –326 which is used to his Examples 6 to 16 of –188 to demonstrate optimum pH and concentration ranges for separation of his "pure" DHIA from his feed stock.

The procedure of –326 was followed on a bench scale by combining 50 g of a supercritical CO2 hop extract (46.5% alpha by uv, 23.25 g), 175 ml of water, 75 ml of hexane, and 13 g of commercial SWS (12% $NaBH_4$ in 40% NaOH, 0.63 molar equivalents). The pH was 13.5. The mixture was heated at 60° C. (140° F.) for three hours, cooled, and acidified to pH 2 with dilute $H_2SO_4$. It was agitated warm for one hour, and the phases separated. The hexane-DHIA phase was washed again with acidic water, and then with water to remove residual boron and acid.

The hexane-DHIA phase was made to 140 ml with hexane, and 20 ml aliquots were withdrawn for the –188 experiments 11–15, which provided his best yields and most "pure" product. Each aliquot is calculated to contain about 3.32 g of DHIA.

To the hexane solution was added 20 ml of distilled water, and the pH adjusted upward with a small amount of dilute KOH to the target pH. The aqueous phase was separated from the hexane phase, which contained resins, beta acids, and other unwanted substances.

In order to determine the purity of the DHIA in the cloudy aqueous phase (Westermann does not report his assay technique, but in any event modern methods were not available), the aqueous phase was extracted with methylene chloride (10 ml) at a pH of 2–3. At this pH the hop substances are extracted into the solvent. The methylene chloride was separated, removed under vacuum, the solids weighed and then assayed by uv and HPLC.

The results are reported in Table 12-I.

TABLE 12-I

Purity of Westermann's DHIA according to present methods, as compared with Westermann's reported purities.

| His No. | pH | wt,g | % by uv | % by HPLC | % post impur | Westermann's Claimed % Purity | Westermann's Claimed % Conc. | This experiment % Yield by uv | This experiment % Yield by HPLC |
|---|---|---|---|---|---|---|---|---|---|
| 11 | 5.9 | 0.888 | 90.5 | 79.4 | 7.4 | 95.5 | 33.4 | 26.7 | 21.2 |
| 12 | 6.5 | 1.126 | 95.2 | 78.3 | 6.5 | 97.4 | 47.4 | 33.9 | 26.7 |
| 13 | 7.0 | 1.240 | 92.2 | 76.9 | 7.3 | 99.2 | 51.8 | 37.5 | 28.7 |
| 14 | 7.5 | 1.246 | 80.3 | 77.9 | 12.4 | 90.7 | 59.2 | 28.7 | 26.8 |
| 15 | 7.95 | 1.388 | 79.8 | 77.1 | 13.4 | 85.1 | 69.2 | 33.4 | 32.2 |

As will be noticed, the weight amounts extracted into the water increase with the pH, as did those of Westermann. This is because the solubility of the hop acids in water increases with pH. The uv purities are below his, being measured by the total absorbance at 254 nm. The HPLC purities, as is expected, are below the uv purities. This is because the HPLC separates the impurities, such as humulinic acid and alpha and beta acids, from the DHIA. Only the DHIA content is used in the HPLC purity calculation. Since humulinic acid has a lower molecular weight than DHIA, and is extracted into water at a lower pH, a higher concentration of that acid will result in a higher uv "purity", such as claimed by him. It is known that the retention times of the individual compounds will change with changes in column conditions. However, the relative positions of the peaks will not change if the same type of column and eluting solvent is used.

Peaks appearing after the last trans isomer are those which are considered post- DHIA and HHIA impurities. Since there are many of them, all with very low area counts in these purified products, they look and are insignificant. In unpurified product, such as commercial DHIA, or a slightly impure product, they would be clearly visible and represent about 8% to 15% and more of the area count.

Figure 2:
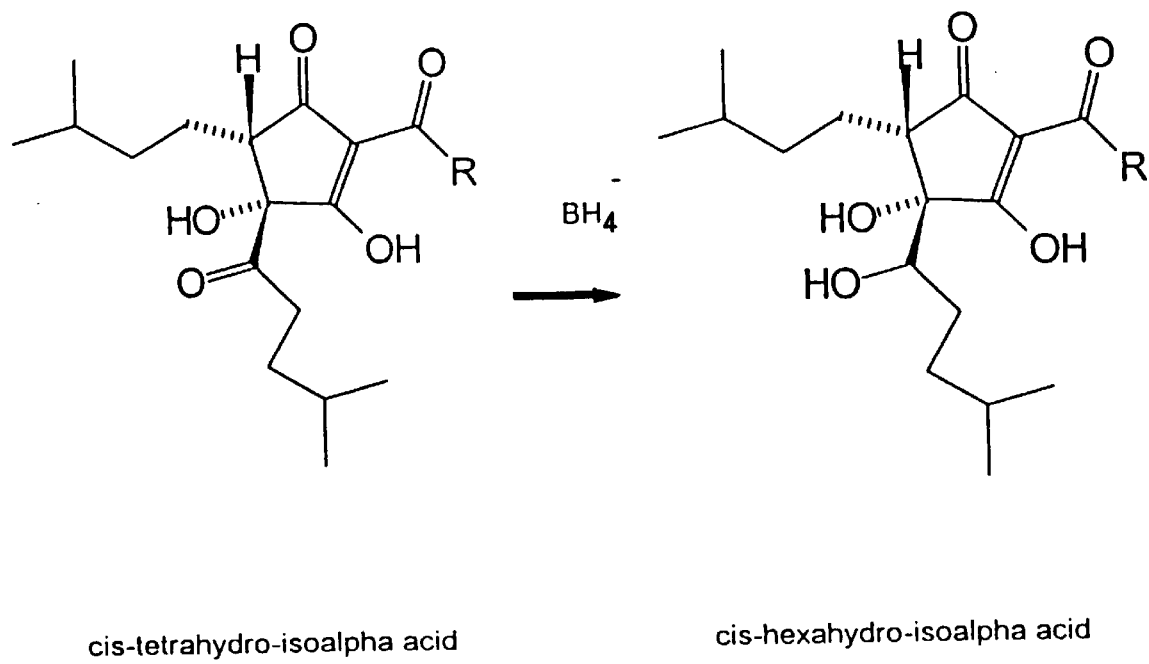
FIG. 2 is a depiction of the structural formulas of cis and trans THIA and HHIA.
Figure 2:
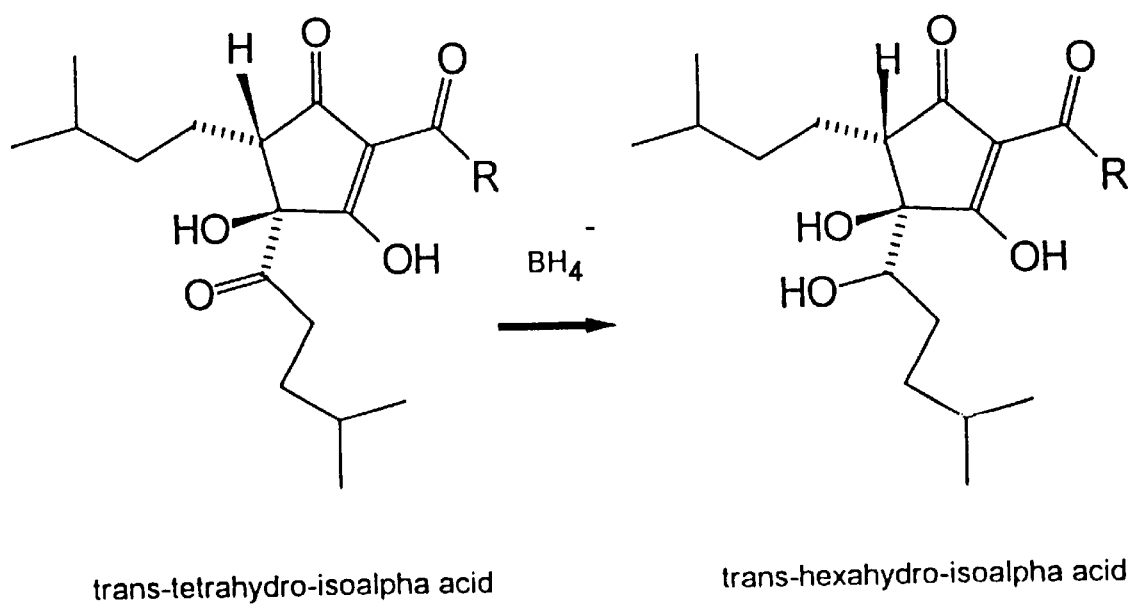

The peaks designated as trans in FIGS. 2 and 5 were made by separating trans IA and THIA by procedures known to the art, and reducing the trans IA and THIA under the conditions of Examples 1–4, which do not epimerize trans isomers to cis isomers. These reduced products contained essentially only the trans peaks. It is known that trans isomers convert to cis isomers upon refluxing at pH 12.5 in water. Their identity was further confirmed by using this procedure.

If his "purity" was determined by total absorbance at 254, the difference can be accounted for by using a higher extinction coefficient than that used in this specification. The trans to cis isomer ratio was less than about 0.1%, so his product is essentially cis.

A high per-cent of post DHIA impurities, as measured by HPLC at peak maximum, along with "waxes", will cause the formation of gummy precipitates in a liquid DHIA solution, even if the product has a high trans:cis ratio, which his product does not.

All of the above products form gummy precipitates in water at pH 7 and form a very cloudy solution at a 1% DHIA concentration at pH 10–11.

EXAMPLE 13

Comparative with Goldstein -810 Examples 4 plus 5.

50.7 g of CO2 extract at 46.5% alpha acids by uv (23.6 g) were combined with a solution consisting of 500 ml water, and sufficient SWS to provide 2.2 mol of NaOH and 0.75 molar equivalents of $NaBH_4$ per mole of hop acids. The pH was 13.5. The mixture was agitated three hours at 60–65° C. It was cooled slightly, and sufficient 50% $H_2SO_4$ added with agitation to drop the pH to about 2. The acidic phase, containing boron, was discarded, and the oil phase washed again at a pH of about 2, the phases separated, and the oil phase washed again with water. The separated organic layer weighed 35 g and assayed 62.8% DHIA by uv.

To 27.5 g of the organic layer was added 31 ml of 1N KOH, which brought the pH to 7. The mixture was agitated at 60–65° C. for 30 minutes. The aqueous DHIA phase was separated from the oil phase. The aqueous phase assayed 46.2% DHIA by uv, and the solids extracted therefrom were 74.1% DHIA by HPLC. The impurities eluting after DHIA were 15% of the area count at peak maximum, far above the critical limit of this invention. Goldstein reported 96% purity for the solids in the aqueous phase, but did not report his assay procedure. The explanation provided for a similar purity discrepancy in Westermann is applicable here. No trans isomers were present, and his product formed a very cloudy solution at 1% in pH 10–11 distilled water. The product itself formed gummy crystals and solids upon standing. It is not suggestive of the presently inventive product for the same reasons as the product of Westermann.

EXAMPLE 14

Comparative with Goldstein-640.

This example follows the procedure of Goldstein-640. Examples 2 and 3, except that it was performed on a bench scale. The amounts of reagents used and the procedures were:

300 g of hop extract, 46.5% alpha acids by uv, and 45% KOH (46.6 g) were agitated and warmed to about 45 deg for about 5 minutes, placed in a separatory funnel, and the lower somewhat alkaline aqueous phase containing the alpha acids was separated. It contained 19.4% alpha by uv, as compared to Goldstein's 16.8%.

46.6 g of the aqueous alpha acid phase were added to 0.5 mol equivalents of $NaBH_4$ (0.48 g) in 7.1 ml of water containing 1 mol equivalent of NaOH (1 g). The pH was 12.7. The reaction mixture was agitated at 175° F. (79° C.) for 2 hours.

The boron was removed from the aqueous phase by acidification with 50% $H_2SO_4$ with agitation, separation of the lower aqueous layer from the upper acidic DHIA oily phase, and by rewashing of the oily phase at a pH of about 2 with water, and then with water alone. The separation and agitation was facilitated by heating to reduce the viscosity of the oil.

6.7 g of the acidic DHIA was agitated with water and the pH adjusted with dilute KOH to make a 40% DHIA solution by uv at pH 7.0. It was agitated at 50–65° C. for one hour. The aqueous phase was allowed to separate from the NILUPS oil phase as the mixture cooled, and the phases separated in a funnel. The DHIA phase assayed 37% DHIA by uv. The HPLC showed that this consisted of 83.4% DHIA, and 7.1% post-DHIA peaks by area count at peak maxima. It was not "pure" DHIA. It did not contain trans DHIA.

The warm liquid DHIA phase separated into two phases, with amorphous semi-crystalline solids appearing overnight. It was reheated to dissolve the crystals prior to evaluation in water, in which it formed a hazy dispersion at pH 10 and concentration of 1%. It formed a two phase solution on cooling before crystals appeared. It formed a hazy dispersion in distilled water.

It will be noted that there are major discrepancies between the uv and HPLC assays of DHIA in this example, as in Westermann. This is because the uv procedure measures concentration at a single wave-length, 254 nm, at which impurities absorb uv light. Therefore the more impure the product is, the greater the discrepancy will be. A product assaying 98% by uv can be much, much lower by HPLC due to impurities absorbing at 254 nm and counted as DHIA in the uv assay, and separated out and not counted by HPLC.

EXAMPLE 15

Comparative with Goldstein -640 Example 1 plus 3.

The procedure in his Example 1 was followed, which differs from his Example 2 in that about 0.74 instead of 0.5 mole equivalents of $NaBH_4$ is used for reduction.

The acidic DHIA-NILUP oil phase was separated from residual boron using acidic water. It was titrated with dilute KOH to a pH of 7.0–7.2., as in his example. The aqueous DHIA phase was separated, after cooling overnight, from the NILUP oil phase. The DHIA aqueous phase assayed 41.5% DHIA by uv, and the DHIA was 80.2% of the HPLC 254 nm area count. The acid form as recovered in his Example 3 assayed 78.2% DHIA, and 8.2% post-DHIA by area count at peak maxima. He does not provided HPLC assays for these final products. Trans DHIA was not detected. Yields were consistent with those reported by Goldstein.

The warm liquid DHIA phase formed amorphous solids overnight. It was reheated to dissolve the crystals prior to evaluation in beer in Example 9.

EXAMPLE 16

Discussion of effect of varying conditions upon the reduction.

The conditions which produce a high trans product are similar to those of the prior art, in that reaction times, temperatures, and pHs, and equivalents of borohydride are found. The reason that the high trans product has not been produced in the prior art is simply that the right combination of conditions has not been used. Indeed, the thrust of the art has been to produce the 35% all cis DHIA first described by Westermann. The prior art conditions under which the reductions were performed were not critical, in that the principal objective was to make sure that essentially all IA was reduced and the light stability improved. This meant that high pHs and temperatures, as well as long reaction times, gave acceptable yields without residual IA, since cis DHIA is stable at high pHs. Furthermore, as over-reduced and other by-products and degradation products do not have the reactive keto group in the molecule, they are light stable. And since humulinic acid type and other degradation products were measured as DHIA by uv analysis, yields as measured by uv at 254 nm were considered acceptable. Commercial production of HHIA essentially follows the procedure of Todd (U.S. Pat. No. 4,666,731), which is similar to Westermann, in which SWS (12% sodium borohydride in 40% NaOH) is used, and the pH during the reduction is above 13. The products are all cis isomers.

The high pH reduction will not make either trans DHIA or trans HHIA. This is because they "epimerize," which means that they isomerize to the cis form under the time, temperature, and/or pH conditions of the prior art. Furthermore, the proper balance between time, temperature, pH, and borohydride equivalents must achieve essentially complete reduction of the IA if the DHIA is to be light stable, and yet not epimerize the trans isomer to the cis one, or form undesirable and haze forming over-reduced products. The following rules can be applied to guide one skilled in the art:

(1) the lower the pH, the longer the reaction time.

(2) the higher the pH, the easier to eliminate residual IA.

(3) the higher the pH the more degradation products, especially in the humulinic acid classification.

(4) the longer the reaction time, the more complete the reduction and the more by-products formed.

(5) the more molar equivalents (ME) of borohydride, the faster the reduction, accompanied by an increase in by-products.

(6) The lower the pH, the more rapidly the borohydride decomposes with the evolution of nascent hydrogen, which can also create undesirable by-products.

The reactions were studied for optimization of the conditions, since prior art conditions did not produce the inventive products. Marginally acceptable DHIA in acceptable yield can be made at a pH of up to about 11.8. Above that pH, formation of the cis isomer predominates, especially above 50° C. Increasing the mole equivalents of borohydride beyond 0.75 moles increases by-product formation to above 15%. By reducing the pH to 11, and the time to two hours, little epimerization occurs and by-product formation is about the same as at pH 11.7. By reducing the pH to 10.5, and the temperature to 50° C., epimerization becomes negligible but the time required to achieve about the same residual IA is 5 to 7 hours. (Shorter reaction times leave unreduced IA, which must be below 0.5% if the product is to be light stable).

Table 16-1 compares the prior art ranges with feasible and optimal conditions for reduction of IA and THIA. It will be noticed that the combination of preferred conditions do not coincide with the prior art. For HHIA, which epimerizes more slowly than DHIA, it is noticed that the pH can safely be raised above the pH for DHIA

TABLE 16-1

Comparative Reaction Conditions with Prior-art.

|  | conc, % | pH | temp, ° C. | ME, BH4 | time, hrs |
|---|---|---|---|---|---|
| DHIA |  |  |  |  |  |
| range | 2–28 | 10–11.8 | 25–75 | 0.4–0.81 | 3–6 |
| preferred | 8–15 | 10–11 | 45–65 | 0.5–0.7 | 3–5 |
| Gold.-640 | 17 | 12.7 | 79 | 0.5 | 2 |
| Gold.-810 | 5 | 12 | 60–65 | 0.75 | 3 |
| West.-326 | 13 | 13.5 | 60 | 0.63 | 3 |
| Koch -879 | 1 | 11 | 25 | 1.97 | 4 |
| HHIA |  |  |  |  |  |
| range | 4–25 | 10–12.2 | 25–80 | 0.4–0.81 | 3–6 |
| preferred | 7–13 | 10.5—11.9 | 45–65 | .5–.7 | 3–5 |
| Todd-731 | 5 | 13.5 | 70 | 0.32 | 3 |
| Worden | 1 | 11.1 | 25 | 1.84 | 4 |

The procedures of both Koch and Worden, who first disclosed DHIA and HHIA, were repeated. It should be noticed that both Koch and Worden use 7.9 to 8.5 times the theoretical hydrogen equivalents of borohydride, whereas the more recent prior art uses a maximum of about 3 times, and the preferred range for making the claimed products is about 1.6 to 2.8 hydrogen equivalents. (Borohydride contains four active hydrogen atoms per mole, and only one mole of hydrogen is used up in reduction, so the theoretical requirement of borohydride is 0.25 molar equivalents). The great excess of hydrogen equivalents produced very high levels of over-reduced and other by products when their examples were repeated. As a consequence, the prior art as taught by them must be considered obsolete in view of Westermann and Todd.

Both the Koch and Worden products formed gummy precipitates at concentrations of 10 to 20% in alkaline water, and turbid solutions at 1%.

Byrne and Shaw (J. Chem. Soc.,(C), 2810–2813, 1971) found that four hydrogen equivalents (1 molar equivalent) of borohydride reduced cis-THIA, whereas eight hydrogen equivalents (2 molar equivalents) were needed to reduce trans-THIA. Because of this large excess, as in the case of Koch and Worden, substantial amounts of over-reduced and other by-products must have been formed. They did not show solid or liquid mixtures of cis and trans isomers.

An HPLC analysis which displays the spectra of the individual peaks, if they are clearly separated, permits the measurement of the over-reduced products made by the prior art and the substantial absence of these products made when the lower hydrogen equivalents employed in the process described in this specification are used, and as claimed.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

We claim:

1. The process of reducing (a) isoalpha acids (IA) to produce dihydroisoalpha acids (DHIA) or (b) tetrahydroisoalpha acids (THIA) to produce hexahydroisoalpha acids (HHIA), the DHIA or the HHIA product having a trans to cis isomer ratio greater than 10%, the reduction being carried out in an aqueous medium at a pH of about 8.5 to about 12.4 using a borohydride.

2. The process of claim 1 wherein IA are reduced to DHIA having a trans to cis isomer ratio greater than 10% using less than about 0.81 molar equivalents of a borohydride and a pH up to about 11.8.

3. The process of claim 1 wherein THIA are reduced to HHIA having a trans to cis isomer ratio greater than 10% using less than about 0.81 molar equivalents of a borohydride.

4. The process of claim 1 in which the temperature at which the reduction is carried out is up to about 75° C. and in which the reaction is terminated before the trans to cis isomer ratio of the product DHIA or HHIA becomes less than 10%.

5. The process of claim 1 wherein the reduction is carried out with up to about 0.65 molar equivalents of borohydride.

6. The process of claim 5 wherein the reduction is carried out with up to about 0.55 molar equivalents of borohydride.

7. The process of claim 1 in which a lower alkanol is also present.

8. The process of claim 1 wherein the pH of the aqueous medium is buffered at about 12.4 or below.

9. The process of claim 8 wherein the buffering agent is selected from potassium and sodium salts of phosphates, citrates, and borates.

10. The process of claim 1 in which a non-reactive water-immiscible solvent is also present.

11. The process of claim 10 in which the water-immiscible solvent is a hydrocarbon containing 10 or less carbon atoms.

12. The process of claim 1 in which hydrocarbon-soluble haze-forming substances are removed from the DHIA or HHIA product by admixing a hydrocarbon with the aqueous DHIA or HHIA phase and removing the hydrocarbon phase, wherein the aqueous DHIA or HHIA phase is 15% or less DHIA or HHIA, and wherein the pH is up to about 10.5, to give a DHIA or HHIA product wherein the remaining hydrocarbon-soluble substances are less than 3% by weight of the DHIA or HHIA product.

13. The process of claim 12 in which the pH is about 7.5–9.5.

14. The process of claim 13 wherein the hydrocarbon has 6 to 10 carbon atoms.

15. The process of claim 1 in which the final aqueous DHIA or HHIA phase is concentrated at a pH below about 10.5 and greater than 6 by evaporation of water, to give a concentrated aqueous phase containing between about 5% and about 40% DHIA or HHIA.

16. The process of claim 15 wherein the pH is between 6.5 and 8.5 and the DHIA or HHIA concentration is less than about 25%.

17. The process of claim 1 wherein the borohydride is selected from the group consisting of sodium borohydride and potassium borohydride.

18. The process of claim 2 wherein the DHIA having a trans to cis isomer ratio greater than 10% is subsequently converted to HHIA having a trans to cis isomer ratio greater than 10% by catalytic hydrogenation.

* * * * *